United States Patent [19]

Imuta et al.

[11] Patent Number: 5,412,128
[45] Date of Patent: May 2, 1995

[54] CATALYST FOR OLEFIN POLYMERIZATION, PROCESS FOR THE POLYMERIZATION OF OLEFIN, AND TRANSITION METAL COMPOUND EMPLOYABLE FOR THE CATALYST

[75] Inventors: Junichi Imuta; Junji Saito; Takashi Ueda, all of Waki; Teruaki Mukaiyama, Tokyo, all of Japan

[73] Assignee: Mitsui Petrochemical Industries, Ltd., Tokyo, Japan

[21] Appl. No.: 87,875

[22] Filed: Jul. 9, 1993

Related U.S. Application Data

[62] Division of Ser. No. 901,015, Jun. 19, 1992.

[30] Foreign Application Priority Data

Jun. 20, 1991 [JP] Japan ................... 3-148846
Aug. 27, 1991 [JP] Japan ................... 3-215606
Sep. 9, 1991 [JP] Japan ................... 3-227976
Sep. 9, 1991 [JP] Japan ................... 3-227977
Jun. 11, 1992 [JP] Japan ................... 4-151853

[51] Int. Cl.$^6$ ............................ C07F 7/08; C07F 17/00
[52] U.S. Cl. ............................ 556/11; 556/12; 556/13; 556/21; 556/53; 556/54; 556/56; 502/155; 526/160; 526/127; 526/153
[58] Field of Search ................ 556/11, 12, 13, 21, 556/53, 54, 56

[56] References Cited

U.S. PATENT DOCUMENTS

| | | | |
|---|---|---|---|
| 3,306,919 | 2/1967 | Brantley et al. | 260/429.5 |
| 4,530,914 | 7/1985 | Ewen et al. | 502/113 |
| 4,871,705 | 10/1989 | Hoel | 502/117 |
| 4,921,825 | 5/1990 | Kioka et al. | 502/104 |
| 5,096,867 | 3/1992 | Canich | 502/103 |
| 5,126,301 | 6/1992 | Tsutsui et al. | 502/108 |
| 5,126,303 | 6/1992 | Resconi et al. | 502/117 |

FOREIGN PATENT DOCUMENTS 8703887 7/1987 European Pat. Off. .
0420436 3/1991 European Pat. Off. .

OTHER PUBLICATIONS

English transition of Journal of Organometallic Chemistry. vol. 363 (1989) C12–C14. Ulf Thewalt et al.
Hawley's Condensed Chemical Dictionary, (1987) 11th edition. pp. 583, 1158, 1259.
Journal of Organometallic Chemistry, vol. 363 (1989) C12–C14 Ulf Thewalt et al.
Australian Journal of Chemistry, vol. 21, No. 1, Jan. 1988, "Oxyanionic complexes of bis(cyclopentadienyl)-titanium (III)", pp. 1181–1186.
Journal of Organometallic Chemistry, vol. 363, 1989, "(CP2Zr) (CF3S03) . . . ", pp. C12–C14.

*Primary Examiner*—Joseph L. Schofer
*Assistant Examiner*—David Wu
*Attorney, Agent, or Firm*—Sherman and Shalloway

[57] ABSTRACT

The catalyst for olefin polymerization of the present invention contains $R_k{}^1R_l{}^2R_m{}^3M(SO_3R^4)$ (M=Zr, Ti or Hf; $R^{1-3}$=a group having a cyclopentadienyl skeleton) as a catalyst component of a transition metal compound. According to the catalyst of the invention, an olefin polymer having excellent particle properties can be prepared with high polymerization activities, and further a copolymer having a narrow composition distribution can be prepared when two or more monomers are copolymerized. Of the above-mentioned transition metal compounds, a compound represented by the following formula is a novel compound unknown so far and shows excellent catalytic properties.

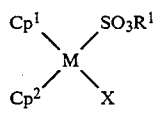

(Cp=a group having a cyclopentadienyl skeleton, X=SO$_3$R, a halogen atom, R, OR, NR$_n$, S(O)$_q$R, SiR$_3$ or P (O)$_q$R$_3$, n=1, 2 or 3; q=0, 1 or 2)

6 Claims, 3 Drawing Sheets

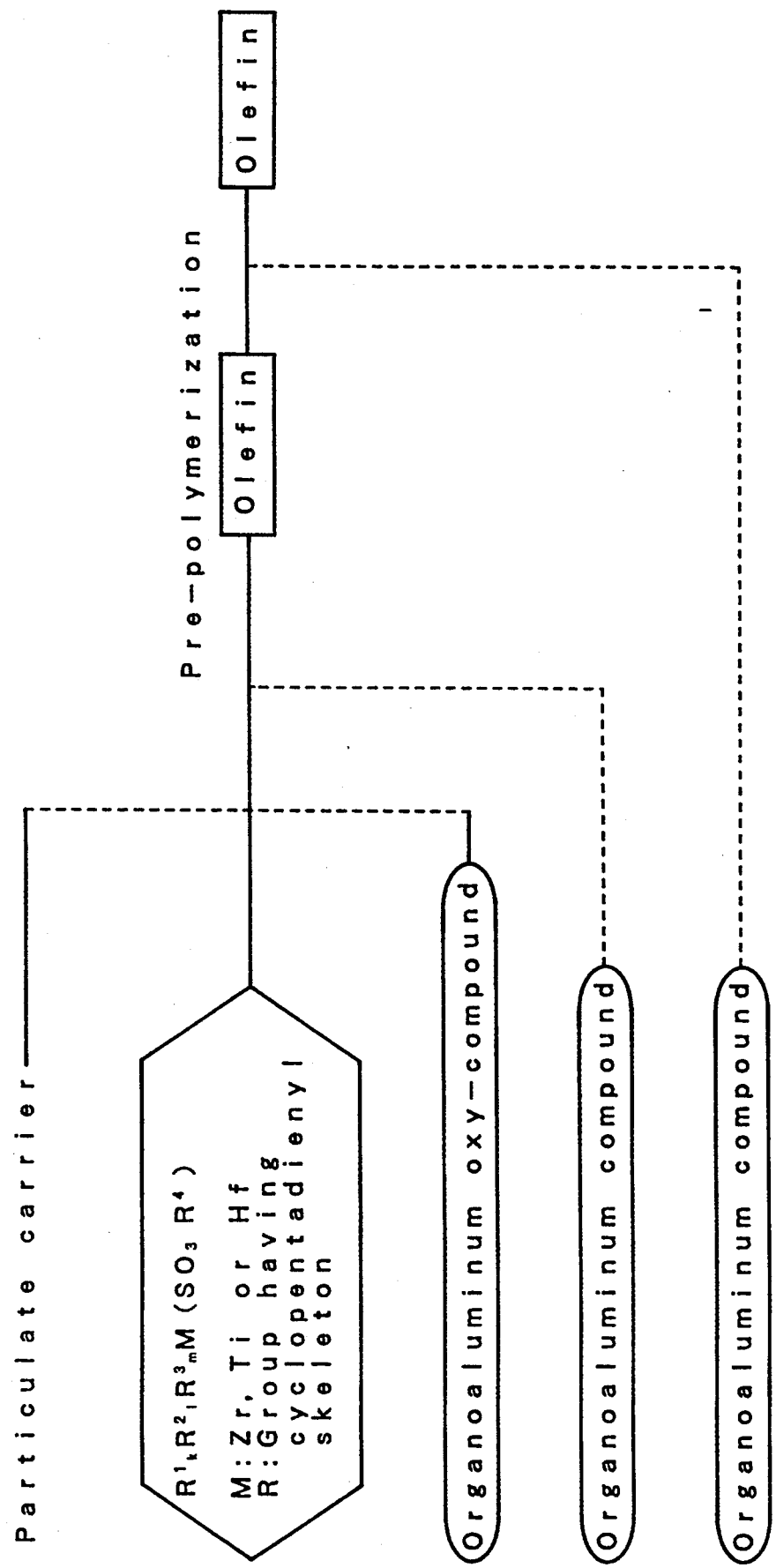

CATALYST FOR OLEFIN POLYMERIZATION, PROCESS FOR THE POLYMERIZATION OF OLEFIN, AND TRANSITION METAL COMPOUND EMPLOYABLE FOR THE CATALYST

This is a continuation of application Ser. No. 07/901,015, filed Jun. 19, 1992.

FIELD OF THE INVENTION

The present invention relates to a catalyst for olefin polymerization and a process for the polymerization of olefin using the catalyst, more particularly to a catalyst for olefin polymerization capable of producing an olefin polymer excellent in particle properties with a high polymerization activity and a process for the polymerization of olefin using the catalyst.

Moreover, the invention relates to a novel transition metal compound preferably used for the above catalyst for olefin polymerization.

BACKGROUND OF THE INVENTION

For preparing α-olefin polymers, there have been heretofore known processes for copolymerizing ethylene and α-olefin in the presence of a titanium catalyst composed of a titanium compound and an organoaluminum compound or a vanadium catalyst composed of a vanadium compound and an organoaluminum compound.

The ethylene/α-olefin copolymers obtained by using a titanium catalyst generally have a wide molecular-weight distribution and a wide composition distribution, and are deteriorated in transparency, anti-surface stickiness and mechanical and physical properties. On the other hand, the ethylene/α-olefin copolymers obtained by using a vanadium catalyst have a molecular-weight distribution and a composition distribution both narrower than those obtained using the titanium catalyst, and they are relatively improved in the transparency, anti-surface stickiness and mechanical and physical properties. However, those properties are still insufficient for various use applications requiring high properties. Hence, now required are catalysts capable of producing α-olefin polymers, particularly ethylene/α-olefin copolymers, much more improved in those properties.

There has recently been developed a new Ziegler type catalyst for olefin polymerization comprising a zirconium compound and an aluminoxane. For example, processes for the preparation of ethylene/α-olefin copolymers using this new Ziegler type catalyst have been proposed in Japanese Patent Provisional Publications, No. 58 (1983)-19309, No. 60 (1985)-35005, No. 60 (1985)-35006, No. 60 (1985)-35007, No. 60 (1985) 35008, etc.

The catalysts composed of a transition metal compound and an aluminoxane proposed in the prior art are excellent in polymerization activities, especially ethylene polymerization activities, as compared with catalysts having been known prior to the appearance of these catalysts which are composed of a transition metal compound and an organoaluminum compound. However, most of the catalysts are soluble in the reaction system, and in most cases the processes for the preparation are limited to a solution polymerization system. In addition, the catalysts have such a problem that, when the manufacture of a polymer having a high molecular weight is tried, the productivity of a polymer is lowered due to a marked increase in the viscosity of the polymer-containing solution.

On the other hand, polymerization of olefin has been tried in a suspension polymerization system or a gas phase polymerization system by using catalysts in which at least one of the transition metal compound component and the aluminoxane component described above is supported on a porous inorganic oxide carrier such as silica, alumina and silica-alumina.

For example, the aforementioned Japanese Patent Provisional Publications No. 60 (1985)-35006, No. 60 (1985)-35007 and No. 60(1985)-35008 disclose that there can be used catalysts in which a transition metal compound and an aluminoxane are supported on silica, alumina, silica-alumina, etc.

Further, the above publications and Japanese Patent Provisional Publications No. 61(1986)-130314 and No. 2(1990)-41303 disclose that a catalyst system in which a metallocene compound of a transition metal compound having, as a ligand, a pentadienyl group (e.g., cyclopentadienyl group), an alkyl group and/or a halogen atom is combined with aluminoxane has a high activity for olefin polymerization and can produce a polymer of excellent properties.

Furthermore, Japanese Patent Provisional Publications No. 60(1985)-106808 and No. 60(1985)-106809 disclose a process for the preparation of a composition composed of an ethylene polymer and a filler. This process comprises polymerizing ethylene or copolymerizing ethylene and α-olefin in the presence of an organoaluminum compound and a filler having an affinity for polyolefin, and a product prepared by pre-contacting a highly activated catalyst component containing a hydrocarbon-soluble titanium compound and/or a zirconium compound with a filler.

Japanese Patent Provisional Publication No. 61(1986)-31404 discloses a process for polymerizing ethylene or copolymerizing ethylene and α-olefin in the presence of a mixed catalyst composed of a transition metal compound and a product obtained by a reaction of trialkylaluminum and water in the presence of silicon dioxide or aluminum oxide.

Furthermore, Japanese Patent Provisional Publications No. 61(1986)-108610 and No. 61(1986)-296008 discloses a process for polymerizing olefin in the presence of a catalyst in which a transition metal compound such as metallocene and an aluminoxane are supported on a carrier such as an inorganic oxide.

However, in the case of polymerizing or copolymerizing olefin in a suspension or gas phase using such a solid catalyst component supported on a carrier as described in the above-mentioned publications, the polymerization activities are markedly lower as compared with the above-described solution polymerization.

In "Journal of Organometallic Chemistry", 363 (1989), C12 to C14 are disclosed $Cp_2Zr$ $(CF_3SO_3)_2$ (THF) and $[Cp_2Zr(CF_3SO_3)$ $(bipy)]^+CF_3SO_3^-$, but these two compounds are lower in olefin polymerization activities as compared with the above-mentioned cyclopentadienyl compound. Moreover, they show markedly low olefin polymerization activities when a concentration of aluminoxane is low.

Under these circumstances, earnestly desired is a novel transition metal compound capable of being a catalyst component for olefin polymerization which shows high activities for olefin polymerization and produces an olefin polymer having excellent properties.

OBJECT OF THE INVENTION

The present invention is intended to solve such problems associated with the prior art technique as described above, and an object of the invention is to provide a catalyst for olefin polymerization capable of producing an olefin polymer of excellent particle properties with high polymerization activities and also capable of producing a copolymer having a narrow composition distribution when monomers of two or more kinds are copolymerized.

A second object of the invention is to provide a process for polymerizing olefin using the above-mentioned catalyst having excellent properties.

A third object of the invention is to provide a novel transition metal compound preferably used as a component of the above-mentioned catalyst for olefin polymerization.

SUMMARY OF THE INVENTION

The first catalyst for olefin polymerization according to the invention comprises [A] a catalyst component of a transition metal compound having a transition metal atom in Group IVB of the periodic table, a ligand containing a —$SO_3R$ group wherein R is an alkyl group, an alkyl group substituted with a halogen atom, an aryl group or an aryl group substituted with a halogen atom or an alkyl group, and a ligand having a cyclopentadienyl skeleton, and [B] an organoaluminum oxy-compound.

The second catalyst for olefin polymerization according to the invention comprises the component [A], the compound [B] and an organoaluminum compound [C].

The third catalyst for olefin polymerization according to the invention comprises a particulate carrier, the component [A] and the compound [B], said component [A] and said compound [B] being supported on the particulate carrier.

The fourth catalyst for olefin polymerization according to the invention comprises a solid catalyst component and the compound [C], wherein the solid catalyst component comprises a particulate carrier, the component [A] and the compound [B], said component [A] and said compound [B] being supported on the particulate carrier.

The fifth catalyst for olefin polymerization according to the invention comprises a particulate carrier, the component [A], the compound [B] and an olefin polymer prepared by prepolymerization.

The sixth catalyst for olefin polymerization according to the invention comprises a particulate carrier, the component [A], the compound [B], the compound [C] and an olefin polymer prepared by prepolymerization.

The process for the polymerization of olefin according to the invention comprises polymerizing or copolymerizing olefin in the presence of the above-mentioned catalyst for olefin polymerization.

The novel transition metal compound according to the invention is represented by the following formula:

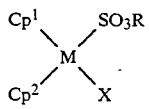

wherein M is a transition metal in Group IVB of the periodic table, each of $Cp^1$ and $Cp^2$ is a group having a cyclopentadienyl skeleton, said group having a cyclopentadienyl skeleton may have a substituent group, $Cp^1$ and $Cp^2$ may be linked to each other through an alkylene group, a substituted alkylene group, a silylene group or a substituted silylene group, R is an alkyl group, an alkyl group substituted with a halogen atom, an aryl group or an aryl group substituted with a halogen atom or an alkyl group, X is $SO_3R$, a halogen atom, R, OR, $NR_n$, $S(O)_qR$, $SiR_3$ or $P(O)_qR_3$, n is 1, 2 or 3, and q is 0, 1 or 2.

BRIEF DESCRIPTION OF THE DRAWINGS

FIGS. 1 to 3 illustrate steps of a process for the preparation of the catalyst for olefin polymerization according to the present invention.

DETAILED DESCRIPTION OF THE INVENTION

Figure 1:
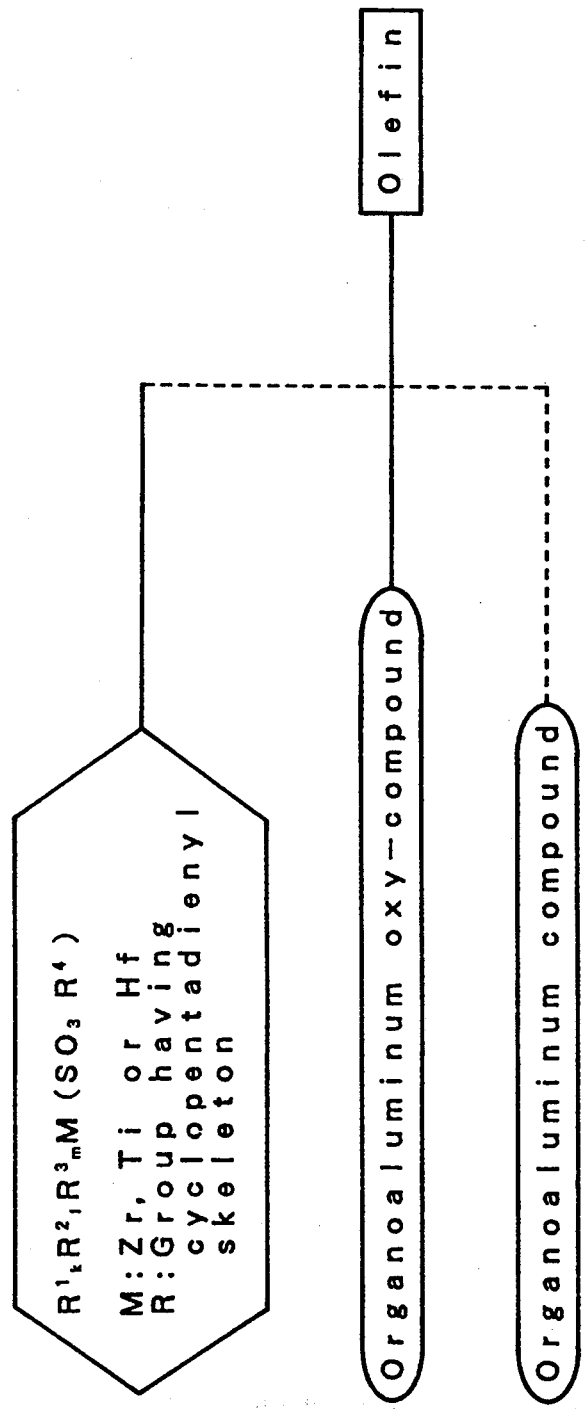

The catalyst for olefin polymerization, the process for the polymerization of olefin using the catalyst and the novel transition metal compound, according to the invention, are described below in detail.

In the invention, the meaning of the term "polymerization" may include not only homopolymerization but also copolymerization, and the meaning of the term "polymer" may include not only homopolymer but also copolymer.

The first and second catalysts for olefin polymerization according to the invention are illustrated below.

The catalyst component [A] used for the first and second catalysts for olefin polymerization according to the invention is a compound of a transition metal in Group IVB of the periodic table which contains a ligand containing a —$SO_3R$ group wherein R is an alkyl group, an alkyl group substituted with a halogen atom, an aryl group or an aryl group substituted with a halogen atom or an alkyl group, and a ligand having a cyclopentadienyl skeleton. In concrete, the catalyst component [A] is for example a transition metal compound represented by the following formula [I].

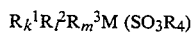

$$R_k^1 R_l^2 R_m^3 M (SO_3R^4) \qquad [I]$$

In the formula [I], M is a transition metal in Group IVB of the periodic table, $R^1$ is a group having a cyclopentadienyl skeleton, and this group having a cyclopentadienyl skeleton may have a substituent group. Each of $R^2$ and $R^3$ is a group having a cyclopentadienyl skeleton (may have a substituent group), $SO3R_4$, a halogen atom, $R^4$ $OR^4$, $NR_n^4$, $S(O)_qR^4$, $SiR_3^4$ or $P(O)_qR_3^4$, wherein $R^4$ is an alkyl group, an alkyl group substituted with a halogen atom, an aryl group or an aryl group substituted with a halogen atom or an alkyl group Two of $R^1$, $R^2$ and $R^3$ may be linked to each other through an alkylene group, a substituted alkylene group, a silylene group or a substituted silylene group. k is a number satisfying the conditions of $k \geq 1$ and $k+l+m=3$, n is 1, 2 or 3, and q is 0, 1 or 2.

In the formula [I], M is a transition metal in Group IVB of the periodic table, and preferably M is zirconium, titanium or hafnium.

Examples of the groups having a cyclopentadienyl skeleton include cyclopentadienyl group; alkyl-substituted cyclopentadienyl group such as methylcyclopentadienyl group, ethylcyclopentadienyl group, n-butylcyclopentadienyl group, dimethylcyclopentadienyl group, trimethylcyclopentadienyl group and pentamethylcyclopentadienyl group; indenyl group; and fluorenyl group.

Of these, preferred are alkyl-substituted cyclopentadienyl group and indenyl group.

Examples of the alkylene groups include ethylene group and propylene group, examples of the substituted alkylene groups include isopropylidene group and diphenylmethylene group, and an example of the substituted silylene group is dimethylsilylene group. Further, examples of the alkyl groups include methyl group, ethyl group, propyl group, isopropyl group and butyl group, and examples of the aryl groups include phenyl group and tolyl group. Halogen is fluorine, chlorine, bromine or iodine.

Concrete examples of the transition metal compounds represented by the formula [I] are given below.

Bis(cyclopentadienyl)-zirconium (IV)-bis(methanesulfonate),
Bis(cyclopentadienyl)-zirconium (IV)-bis(p-toluenesulfonate),
Bis(cyclopentadienyl)-zirconium (IV)-bis(trifluoromethanesulfonate),
Bis(cyclopentadienyl)-zirconium (IV)-bis(benzenesulfonate),
Bis(cyclopentadienyl)-zirconium (IV)-bis(2,4,6-trimethylbenzenesulfonate),
Bis(cyclopentadienyl)-zirconium (IV)-bis(2,4,6-triisopropylbenzenesulfonate),
Bis(cyclopentadienyl)-zirconium (IV)-bis(pentafluorobenzenesulfonate),
Bis(cyclopentadienyl)-zirconium (IV)-(benzenesulfonate) monochloride,
Bis(cyclopentadienyl)-zirconium (IV)-(2,4,6-trimethylbenzenesulfonate) monochloride,
Bis(cyclopentadienyl)-zirconium (IV)-(2,4,6-triisopropylbenzenesulfonate) monochloride,
Bis(cyclopentadienyl)-zirconium (IV)-(pentafluorobenzenesulfonate) monochloride,
Bis(cyclopentadienyl)-zirconium (IV)-(etoxy) (trifluoromethanesulfonate),
Bis(methylcyclopentadienyl)-zirconium (IV)-bis(trifluoromethanesulfonate),
Bis(methylcyclopentadienyl)-zirconium (IV)-trifluoromethanesulfonate monochloride,
Bis(1,3-dimethylcyclopentadienyl)-zirconium (IV)-bis(trifluoromethanesulfonate),
Bis(1,3-dimethylcyclopentadienyl)-zirconium (IV)-(trifluoromethanesulfonate) monochloride,
Bis(1,3-dimethylcyclopentadienyl)-zirconium (IV)-bis(benzenesulfonate),
Bis(1,3-dimethylcyclopentadienyl)-zirconium (IV)-bis(p-toluenesulfonate),
Bis(1,3-dimethylcyclopentadienyl)-zirconium (IV)-bis(2,4,6-trimethylbenzenesulfonate),
Bis(1,3-dimethylcyclopentadienyl)-zirconium (IV)-bis(2,4,6-triisopropylbenzenesulfonate),
Bis(1,3-dimethylcyclopentadienyl)-zirconium (IV)-bis(pentafluorobenzenesulfonate),
Bis(1,3-dimethylcyclopentadienyl)-zirconium (IV)-(benzenesulfonate) monochloride,
Bis(1,3-dimethylcyclopentadienyl)-zirconium (IV)-(2,4,6-trimethylbenzenesulfonate) monochloride,
Bis(1,3-dimethylcyclopentadienyl)-zirconium (IV)-(2,4,6-triisopropylbenzenesulfonate) monochloride,
Bis(1,3-dimethylcyclopentadienyl)-zirconium (IV)-(pentafluorobenzenesulfonate) monochloride,
Bis(1,3-dimethylcyclopentadienyl)-zirconium (IV)-(trifluoromethanesulfonate)dimethylamide,
Bis(1,3,5-trimethylcyclopentadienyl)-zirconium (IV)-bis(trifluoromethanesulfonate),
Bis(1,3,5-trimethylcyclopentadienyl)-zirconium (IV)-trifluoromethanesulfonate monochloride,
Ethylenebis(indenyl)-zirconium (IV)-bis(trifluoromethanesulfonate),
Ethylenebis(indenyl)-zirconium (IV)-bis(methanesulfonate),
Ethylenebis(indenyl)-zirconium (IV)-bis(p-toluenesulfonate),
Ethylenebis(indenyl)-zirconium (IV)-bis(p-chlorobenzenesulfonate),
Ethylenebis(indenyl)-zirconium (IV)-trifluoromethanesulfonate monochloride,
Ethylenebis(indenyl)-zirconium (IV)-trifluoromethanesulfonate monobromide,
Ethylenebis(indenyl)-zirconium (IV)-trifluoromethanesulfonate monofluoride,
Ethylenebis(indenyl)-zirconium (IV)-trifluoromethanesulfonate monoiodide,
Ethylenebis(indenyl)-zirconium (IV)-methanesulfonate monochloride,
Ethylenebis(indenyl)-zirconium (IV)-p-toluenesulfonate monochloride,
Ethylenebis(indenyl)-zirconium (IV)-(trifluoromethanesulfonate)methyl,
Ethylenebis(indenyl)-zirconium (IV)-(methanesulfonate)methyl,
Ethylenebis(indenyl)-zirconium (IV)-(trifluoromethanesulfonate) phenyl,
Ethylenebis(indenyl)-zirconium (IV)-(methanesulfonate) phenyl,
Ethylenebis(indenyl)-zirconium (IV)-(trifluoromethanesulfonate)methoxy,
Ethylenebis(indenyl)-zirconium (IV)-(methanesulfonate)methoxy,
Ethylenebis(indenyl)-zirconium (IV)-(trifluoromethanesulfonate)dimethylamide,
Ethylenebis(indenyl)-zirconium (IV)-(methanesulfonate)dimethylamide,
Ethylenebis(indenyl)-zirconium (IV)-(trifluoromethanesulfonate)methylmercapto,
Ethylenebis(indenyl)-zirconium (IV)-(methanesulfonate)methylmercapto,
Ethylenebis(indenyl)-zirconium (IV)-(trifluoromethanesulfonate)thiophenyl,
Ethylenebis(indenyl)-zirconium (IV)-(methanesulfonate)thiophenyl,
Ethylenebis(indenyl)-zirconium (IV)-(trifluoromethanesulfonate)methylsulfone,
Ethylenebis(indenyl)-zirconium (IV)-(methanesulfonate)methylsulfone,
Ethylenebis(indenyl)-zirconium (IV)-(trifluoromethanesulfonate)methylsulfoxide,
Ethylenebis(indenyl)-zirconium (IV)-(methanesulfonate)methylsulfoxide,
Ethylenebis(indenyl)-zirconium (IV)-(trifluoromethanesulfonate)trimehylsilyl,
Ethylenebis(indenyl)-zirconium (IV)-(methanesulfonate)trimethylsilyl,
Ethylenebis(indenyl)-zirconium (IV)-(trifluoromethanesulfonate)trimethylphosphine,
Ethylenebis(indenyl)-zirconium (IV)-(methanesulfonate)trimethylphosphine,
Ethylenebis(indenyl)-zirconium (IV)-(trifluoromethanesulfonate)triphenylphosphine,
Ethylenebis(indenyl)-zirconium (IV)-(methanesulfonate)triphenylphosphine, Ethylenebis(indenyl)-zirconium (IV)-bis(trifluoromethanesulfonate),
Ethylenebis(indenyl)-zirconium (IV)-bis(benzenesulfonate),
Ethylenebis(indenyl)-zirconium (IV)-bis(2,4,6-trimethylbenzenesulfonate),
Ethylenebis(indenyl)-zirconium (IV)-bis(2,4,6-triisopropylbenzenesulfonate),
Ethylenebis(indenyl)-zirconium (IV)-bis(pentafluorobenzenesulfonate),
Ethylenebis(indenyl)-zirconium (IV)-(benzenesulfonate) monochloride,
Ethylenebis(indenyl)-zirconium (IV)-(2,4,6-trimethylbenzenesulfonate) monochloride,
Ethylenebis(indenyl)-zirconium (IV)-(2,4,6-triisopropylbenzenesulfonate) monochloride,
Ethylenebis(indenyl)-zirconium (IV)-(pentafluorobenzenesulfonate) monochloride,
Ethylenebis(indenyl)-hafnium (IV)-bis(trifluoromethanesulfonate),
Ethylenebis(indenyl)-hafnium (IV)-bis(methanesulfonate),
Ethylenebis(indenyl)-hafnium (IV)-bis(p-toluenesulfonate),
Ethylenebis(indenyl)-hafnium (IV)-bis(p-chlorobenzenesulfonate),
Ethylenebis(indenyl)-hafnium (IV)-trifluoromethanesulfonate monochloride,
Ethylenebis(indenyl)-hafnium (IV)-trifluoromethanesulfonate monobromide,
Ethylenebis(indenyl)-hafnium (IV)-trifluoromethanesulfonate monofluoride,
Ethylenebis(indenyl)-hafnium (IV)-trifluoromethanesulfonate monoiodide,
Ethylenebis(indenyl)-hafnium (IV)-methanesulfonate monochloride,
Ethylenebis(indenyl)-hafnium (IV)-p-toluenesulfonate monochloride,
Ethylenebis(indenyl)-titanium (IV)-bis(trifluoromethanesulfonate),
Ethylenebis(indenyl)-titanium (IV)-bis(methanesulfonate),
Ethylenebis(indenyl)-titanium (IV)-bis(p-toluenesulfonate),
Ethylenebis(indenyl)-titanium (IV)-bis(p-chlorobenzenesulfonate),
Ethylenebis(indenyl)-titanium (IV)-trifluoromethanesulfonate monochloride,
Ethylenebis(indenyl)-titanium (IV)-trifluoromethanesulfonate monobromide,
Ethylenebis(indenyl)-titanium (IV)-trifluoromethanesulfonate monofluoride,
Ethylenebis(indenyl)-titanium (IV)-trifluoromethanesulfonate monoiodide,
Ethylenebis(indenyl)-titanium (IV)-methanesulfonate monochloride,
Ethylenebis(indenyl)-titanium (IV)-p-toluenesulfonate monochloride,
Dimethylsilylbis(indenyl)-zirconium (IV)-bis(trifluoromethanesulfonate),
Dimethylsilylbis(indenyl)-zirconium (IV)-bis(methanesulfonate),
Dimethylsilylbis(indenyl)-zirconium (IV)-bis(p-toluenesulfonate),
Dimethylsilylbis(indenyl)-zirconium (IV)-bis(p-chlorobenzenesulfonate),
Dimethylsilylbis(indenyl)-zirconium (IV)-trifluoromethanesulfonate monochloride,
Dimethylsilylbis(indenyl)-zirconium (IV)-trifluoromethanesulfonate monobromide,
Dimethylsilylbis(indenyl)-zirconium (IV)-trifluoromethanesulfonate monofluoride,
Dimethylsilylbis(indenyl)-zirconium (IV)-trifluoromethanesulfonate monoiodide,
Dimethylsilylbis(indenyl)-zirconium (IV)-methanesulfonate monochloride,
Dimethylsilylbis(indenyl)-zirconium (IV)-p-toluenesulfonate monochloride,
Dimethylsilylbis(indenyl)-zirconium (IV)-bis(benzenesulfonate),
Dimethylsilylbis(indenyl)-zirconium (IV)-bis(2,4,6-trimethylbenzenesulfonate),
Dimethylsilylbis(indenyl)-zirconium (IV)-bis(2,4,6-triisopropylbenzenesulfonate),
Dimethylsilylbis(indenyl)-zirconium (IV)-bis(pentafluorobenzenesulfonate),
Dimethylsilylbis(indenyl)-zirconium (IV)-(benzenesulfonate) monochloride,
Dimethylsilylbis(indenyl)-zirconium (IV)-(2,4,6-trimethylbenzenesulfonate) monochloride,
Dimethylsilylbis(indenyl)-zirconium (IV)-(2,4,6-triisopropylbenzenesulfonate) monochloride,
Dimethylsilylbis(indenyl)-zirconium (IV)-(pentafluorobenzenesulfonate) monochloride,
Diphenylmethylenebis(indenyl)-zirconium (IV)-bis(trifluoromethanesulfonate),
Diphenylmethylenebis(indenyl)-zirconium (IV)-bis(methanesulfonate),
Diphenylmethylenebis(indenyl)-zirconium (IV)-bis(p-toluenesulfonate),
Diphenylmethylenebis(indenyl)-zirconium (IV)-bis(p-chlorobenzenesulfonate),
Diphenylmethylenebis(indenyl)-zirconium (IV)-trifluoromethanesulfonate monochloride,
Diphenylmethylenebis(indenyl)-zirconium (IV)-trifluoromethanesulfonate monobromide,
Diphenylmethylenebis(indenyl)-zirconium (IV)-trifluoromethanesulfonate monofluoride,
Diphenylmethylenebis(indenyl)-zirconium (IV)-trifluoromethanesulfonate monoiodide,
Diphenylmethylenebis(indenyl)-zirconium (IV)-methanesulfonate monochloride,
Diphenylmethylenebis(indenyl)-zirconium (IV)-p-toluenesulfonate monochloride,
Diphenylsilylbis(indenyl)-zirconium (IV)-bis(benzenesulfonate),
Diphenylsilylbis(indenyl)-zirconium (IV)-bis(2,4,6-trimethylbenzenesulfonate),
Diphenylsilylbis(indenyl)-zirconium (IV)-bis(2,4,6-triisopropylbenzenesulfonate),
Diphenylsilylbis(indenyl)-zirconium (IV)-bis(pentafluorobenzenesulfonate),
Diphenylsilylbis(indenyl)-zirconium (IV)-(benzenesulfonate) monochloride,
Diphenylsilylbis(indenyl)-zirconium (IV)-(2,4,6-trimethylbenzenesulfonate) monochloride,
Diphenylsilylbis(indenyl)-zirconium (IV)-(2,4,6-triisopropylbenzenesulfonate) monochloride, and
Diphenylsilylbis(indenyl)-zirconium (IV)-(pentafluorobenzenesulfonate) monochloride.

Such transition metal compounds can be prepared from a compound represented by the following formula [II] and a sulfonic acid derivative represented by the following formula [III].

$$R_k^1 R_l^2 R_m^3 MX \quad [II]$$

In the formula [II], M is a transition metal in Group IVB of the periodic table, $R^1$ is a group having a cyclopentadienyl skeleton, and this group having a cyclopentadienyl skeleton may have a substituent group. Each of $R^2$ and $R^3$ is a group having a cyclopentadienyl skeleton (may have a substituent group), $SO_3R_4$ a halogen atom, $R^4$ $OR^4$, $NR_n^4$, $S(O)_qR^4$, $SiR_3^4$ or $P(O)_qR_3^4$, wherein $R^4$ is an alkyl group, an alkyl group substituted with a halogen atom or an alkyl group, an aryl group or an aryl group substituted with a halogen atom or an alkyl group Two of $R^1$, $R^2$ and $R^3$ may be linked to each other through an alkylene group, a substituted alkylene group, a silylene group or a substituted silylene group. k is a number satisfying the conditions of $k \geq 1$ and $k+1+m=3$, n is 1, 2 or 3, and q is 0, 1 or 2. X is halogen.

$$R^4SO_3Y \qquad [III]$$

In the formula [III], $R^4$ is an alkyl group, an alkyl group substituted with a halogen atom, an aryl group, or an aryl group substituted with a halogen atom or an alkyl group. Y is an Ag, alkali metal (e.g., Na and K) or an ammonium group (e.g., triethyl ammonium and tri(n-octyl)ammonium).

The preparation of the transition metal compounds from the compound represented by the formula [II] and the sulfonic acid derivative represented by the formula [III] is carried out in accordance with the following reaction formula.

$$R_k^1R_l^2R_m^3MX + R_4SO_3Y \rightarrow R_k^1R_l^2R_m^3M(SO_3R^4)$$

The reaction conditions in this reaction varies depending upon the composition of the aimed compound [I], but the compound [III] is generally used in an amount of 1-10 times by mol, preferably 1-3 times by mole, of the amount of the compound [II]. The reaction temperature is generally in the range of $-20°$ to $180°$ C., preferably $0°$ to $130°$ C., and the reaction period is generally in the range of 0.5 to 48 hours, preferably 2 to 12 hours.

Suitable solvents used in this reaction include aliphatic hydrocarbons such as hexane and decane; aromatic hydrocarbons such as benzene, toluene and xylene; halogenated hydrocarbons such as carbon tetrachloride, chloroform and methylene chloride; and ketones such as acetone and methyl isobutyl ketone; and acetonitrile. Of these, toluene and xylene are particularly preferred. Such hydrocarbon solvent as mentioned above is used generally in an amount of 1-1,000 times, preferably 50-500 times, of the amount of the compound [II].

The catalyst component [B] used in the invention may be aluminoxane hitherto known or such benzene-insoluble organoaluminum oxy compounds.

The known aluminoxane may be prepared, for example, by the following methods.

(1) A method wherein suspensions of compounds containing adsorbed water or salts containing water of crystallization, for example, magnesiumchloride hydrate, copper sulfate hydrate, aluminum sulfate hydrate, nickel sulfate hydrate and ceriun (I) chloride hydrate, in hydrocarbon solvents are allowed to react with an organoaluminum compound such as trialkylaluminum, and the desired aluminoxane is recovered as a hydrocarbon solution containing the same.

(2) A method wherein an organoaluminum compound such as trialkylaluminum is treated directly with water, ice or water vapor in such solvent as benzene, toluene, ethyl ether or tetrahydrofuran, and the desired aluminoxane is recovered as a hydrocarbon solution containing the same.

(3) A method wherein an organoaluminum compound such as trialkylaluminum is allowed to react with an organotin oxide in a solvent such as decane, benzene or toluene.

The aluminoxane as illustrated above may contain small amounts of organometallic components. From the above-mentioned solution containing aluminoxane as recovered, the solvent or unaltered organoaluminum compound is removed by distillation, and the remaining aluminoxane may dissolved again in a solvent.

The organoaluminum compound used in preparing the above-mentioned solution of aluminoxane includes concretely trialkylaluminum such as trimethylaluminum, triethylaluminum, tripropylalminum, triisopropylaluminum, tri-n-butylaluminum, triisobutylaluminum, tri-secbutylaluminum, tri-tert-butylaluminum, tripentylaluminum, trihexylaluminum, trioctylaluminum, tridecylaluminum, tricycloalkylaluminum such as tricyclohexylaluminum or tricyclooctylaluminum;

dialkylaluminum halide such as dimethylaluminum chloride, diethylaluminum chloride, diethylaluminum bromide or diisobutylaluminum chloride;

dialkylaluminum hydride such as diethylaluminum hydride or diisobutylaluminum hydride;

dialkylaluminum alkoxide such as dimethylaluminum methoxide or diethylaluminum ethoxide; and dialkylaluminum aryloxide such as diethylaluminum phenoxide.

Of these solvents as exemplified above, particularly preferred is trialkylaluminum.

Furthermore, there may also be used as the organoaluminum compound isoprenylaluminum represented by the general formula $$(i\text{-}C_4H_9)_xAl_y(C_5H_{10})_z \qquad [IV]$$

wherein x, y and z are each a positive number, and $z \geq 2x$.

The organoaluminum compounds mentioned above may be used either singly or in combination.

Solvents used in the solutions of aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; or haloganated hydrocarbons such as halides, particularly chloride and bromides, of the above-mentioned aromatic, aliphatic and alicyclic hydrocarbons. In addition thereto, there may also be used ethers other than ethyl ether and tetrahydrofuran. Of these solvents as exemplified above, particularly preferred are aromatic hydrocarbons.

The benzene-insoluble organoaluminum oxy-compound may be obtained by a process comprising bringing a solution of an aluminoxane into contact with water or an active hydrogen containing-compound or a process comprising bringing such an organoaluminum as described above into contact with water, directly.

In the first process for obtaining the benzene-insoluble organoaluminum oxy compound, the solution of the aluminoxane is brought into contact with water or the active hydrogen containing-compound.

Examples of the active hydrogen-containing compound include alcohols such as methanol, ethanol, n-propanol and isopropanol;

diols such as ethylene glycol and hydroquinone; and organic acids such as acetic acid and propionic acid.

Of these compounds, preferred are alcohols and diols, and particularly preferred are alcohols.

Water or the active hydrogen containing compound with which the solution of an aluminoxane is brought into contact may be used as a solution or a dispersions in a hydrocarbon solvent such as benzene, toluene and hexane, in an ether solvent such as tetrahydrofuran or in an amine solvent such as triethylamine, or may be used in the form of vapor or solid. The water with which the solution of an aluminoxane is brought into contact may be water of crystallization of a salt such as magnesium chloride, magnesium sulfate, aluminum sulfate, copper sulfate, nickel sulfate, iron sulfate and cerous chloride, or adsorbed water adsorbed to an inorganic compound such as silica, alumina and aluminum hydroxide or a polymer.

Reaction of an aluminoxane in a solution with water or an active hydrogen-containing compound is carried out usually in a solvent.

The solvent includes the solvents described above, for example, the hydrocarbon solvents such as aromatic hydrocarbons; aliphatic hydrocarbons and alicyclic hydrocarbons, petroleum fractions, halogenated hydrocarbons and ethers. Of these solvents as exemplified above, particularly preferred are aromatic hydrocarbons.

In the reaction as mentioned above, water or the active hydrogen-containing compound is used in an amount of 0.1-5 moles, preferably 0.2-3 moles based on 1 gram atom of Al present in the solution of an aluminoxane. The concentration in terms of aluminum atom in the reaction system is normally $1 \times 10^{-3} - 5$ gram atom/l, preferably $1 \times 10^{-2} - 3$ gram atom/l, and the concentration of water in the reaction system is normally $2 \times 10^{-4} - 5$ mol/l, preferably $2 \times 10^{-3} - 3$ mol/l.

The solution of an aluminoxane may be brought into contact with water or the active hydrogen-containing compound, for example, by the following procedures.

(1) A procedure which comprises bringing the solution of an aluminoxane into contact with a hydrocarbon solvent containing water or the active hydrogen-containing compound.

(2) A procedure which comprises blowing steam or the vapor of the active hydrogen-containing compound into the solution of an aluminoxane, thereby bringing the aluminoxane into contact with the steam or vapor.

(3) A procedure which comprises bringing the solution of an aluminoxane into contact directly with water, ice or the active hydrogen-containing compound.

(4) A procedure which comprises mixing the solution of an aluminoxane with a suspension of an adsorbed water-containing compound or a water of crystallization-containing compound in hydrocarbon, or with a suspension of a compound, to which the active hydrogen-containing compound is adsorbed, in hydrocarbon, thereby bringing the aluminoxane into contact with the adsorbed water or water of crystallization.

The solution of an aluminoxane may contain other components so long as they do not exert adverse effects on the reaction of the aluminoxane with water or the active hydrogen-containing compound. The above-mentioned reaction of an aluminoxane in a solution with water or thee active hydrogen-containing compound is carried out at a temperature of usually −50° to 150° C., preferably to 120° C., more preferably 20° to 100° C. The reaction time employed is usually 0.5 to 300 hours, preferably about 1 to 150 hours, though said reaction time varies largely depending upon the reaction temperature used.

In the second process for obtaining the benzene insoluble organoaluminum oxy-compound, such an organoaluminum as described above is brought into contact with water directly.

In this case, water is used in such an amount that the organoaluminum atoms dissolved in the reaction system are not greater than 20% based on the total organoaluminum atoms.

Water with which the organoaluminum compound is brought into contact may be used as a solution or dispersion in a hydrocarbon solvent such as benzene, toluene and hexane, an ether solvent such as tetrahydrofuran or an amine solvent such as triethylamine, or may be used in the form of steam or ice. The water with which the organoaluminum compound is brought into contact may be water of crystallization of a salt such as magnesium chloride, magnesium sulfate, aluminum sulfate, copper sulfate, nickel sulfate, iron sulfate and cerous chloride, or adsorbed water adsorbed to an inorganic compound such as silica, alumina and aluminum hydroxide or a polymer.

Reaction of the organoaluminum compound with water is carried out usually in a solvent, for example, hydrocarbon solvents or halogenated hydrocarbon solvents described above. Of these solvents, particularly preferred is aromatic hydrocarbons.

The concentration of the organoaluminum compound in the reaction system in terms of aluminum atom is desirably $1 \times 10^{-3} - 5$ gram atom/l, preferably $1 \times 10^{-2} - 3$ gram atom/l, and the concentration of water in the reaction system is desirably $1 \times 10^{-3} - 5$ mol/l, preferably $1 \times 10^{-2} - 3$ mol/l. In the reaction mentioned above, the organoaluminum atoms dissolved in the reaction system are not greater than 20%, preferably not greater than 10%, more preferably 0 to 5% based on the total organoaluminum atoms.

The organoaluminum compound may be brought into contact with water, for example, by the following procedures.

(1) A procedure which comprises bringing the hydrocarbon solution of the organoaluminum into contact with a hydrocarbon solvent containing water.

(2) A procedure which comprises blowing steam into the hydrocarbon solution of the organoaluminum, etc., thereby bringing the organoaluminum into contact with the steam.

(3) A procedure which comprises mixing the hydrocarbon solution of the organoaluminum with a suspension of an adsorbed water-containing compound or a water of crystallization-containing compound in hydrocarbon, thereby bringing the organoaluminum into contact with the adsorbed water or water of crystallization.

(4) A procedure which comprises bringing the hydrocarbon solution of the organoaluminum into contact directly with ice.

The hydrocarbon solution of the organoaluminum as described above may contain other components so long as they do not exert adverse effects on the reaction of the organoaluminum with water.

The above-mentioned reaction of the organoaluminum with water is carried out at a temperature of usually −100° to 150° C., preferably −70° to 100° C., more preferably at −50° to 80° C. The reaction time employed is usually 1 to 200 hours, preferably 2 to 100 hours, though the reaction time varies largely depending upon the reaction temperature.

The benzene-insoluble organoaluminum oxy-compounds used in the invention contain an Al component soluble in benzene at 60° C. in an amount of not greater than 10% preferably not greater than 5%, particularly preferably not greater than 2% in terms of Al atom, and they are insoluble or sparingly soluble in benzene. Solubility in benzene of such organoaluminum oxy-compounds as mentioned above is obtained by suspending in 100 ml of benzene the organoaluminum oxy-compound in an amount corresponding to 100 mg atoms in terms of Al, mixing the resulting suspension at 60° C. for 6 hours with stirring, filtering the resulting mixture with a G-5 glass filter equipped with a jacket kept at 60° C. washing 4 times the solid portion separated on the filter with 50 ml of benzene at 60° C., and measuring the amount (x mmole) of Al atoms present in the whole filtrate.

When the benzene-insoluble organoaluminum oxy-compounds as described above of the present invention are analyzed by infrared spectrophotometry (IR), a ratio ($D_{1260}/D_{1220}$) of an absorbance ($D1260$) at about 1260 cm$^{-1}$ to an absorbance ($D1220$) at about 1220 cm$^{-1}$ is preferably not greater than 0.09, more preferably not greater than 0.08, particularly preferably in the range of 0.04 to 0.07.

Infrared spectrophotometric analysis of the organoaluminum oxy-compounds is carried out in the following manner.

First, the organoaluminum oxy-compound is ground, together with nujol, in an agate mortar in a nitrogen box to form paste. Next, the paste-like sample thus obtained is held between KBr plates, and IR spectrum is measured in a nitrogen atmosphere by means of IR-810 manufactured by Nippon Bunko K.K. From the thus obtained IR spectrum, a $D_{1260}/D_{1220}$ ratio is sought, and a value of said ratio is obtained in the following manner.

(a) A line connecting a maximum point at about 1280 cm$^{-1}$ and a maximum point at about 1240 cm$^{-1}$ is taken as a base line $L_1$.

(b) A transmittance (T %) of an absorption minimum point at about 1260 cm$^{-1}$ and a transmittance ($T_0$%) of a point of intersection formed by a vertical line from said absorption minimum point to a wave number axis (abscissa) and said base line L1 are read, and an absorbance ($D_{1260}$=log $T_0/T$) is calculated.

(c) Similarly, a line connecting maximum points at about 1280 cm$^{-1}$ and at about 1180 cm$^{-1}$ is taken as a base line $L_2$.

(d) A transmittance (T' %) of an absorption minimum point at about 1220 cm$^{-1}$ and a transmittance ($T'_0$%) of a point of intersection formed by a vertical line from said absorption minimum point to a wave number axis (abscissa) and said base line $L_2$ are read, and an absorbance ($D_{1220}$=log $T'_0/T'$) is calculated.

(e) From these values as obtained above, a $D_{1260}/D_{1220}$ ratio is calculated.

The benzene-soluble organoaluminum oxy-compound has a $D_{1260}/D_{1220}$ value of about 0.10 to 0.13, and thus the benzene-insoluble organoaluminum oxy-compound of the present invention obviously differ from the known benzene-soluble organoaluminum oxy-compound on the value of $D_{1260}/D_{1220}$.

The benzene-insoluble organoaluminum oxy-compounds as described above are presumed to have an alkyloxyaluminum unit represented by the formula [V]

[V]

In the above-mentioned alkyloxyaluminum unit (i) represented by the formula IV] of the benzene-insoluble organoaluminum oxy-compounds used in the invention, $R^5$ includes hydrocarbon groups having 1-9 carbon atoms, for example, methyl, ethyl, n-propyl, isopropyl, n-butyl, isobutyl, pentyl, hexyl, octyl, decyl, cyclohexyl and cyclooctyl. Of these hydrocarbon groups exemplified above, preferred are methyl and ethyl, and particularly preferred is methyl. In the benzene-insoluble organoaluminum oxy-compounds, one or more kinds of the above-mentioned alkyloxyaluminum units (i) represented by the above formula [V] may be contained.

In addition to the alkyloxyaluminum unit of the formula [V], one or more kinds of an alkyloxyaluminum unit (ii) represented by the following formula [VI] may be contained.

[VI]

wherein $R^6$ is a hydrocarbon group of 10 to 12 carbon atoms, a alkoxy group of 1–12 carbon atoms, aryloxy group of 6–20 carbon atoms, hydroxyl group, halogen or hydrogen.

In this case, the organoaluminum oxy-compounds desirably contain the alkyloxyaluminum unit (i) and the alkyloxyaluminum unit (ii) so that the alkyloxyaluminum unit (i) is in a proportion of not less than 30 mol %, preferably not less than 50 mol %, particularly preferably not less than 70 mol %.

The catalyst component [C] used in the second catalyst of the present invention are represented by the formula:

[VII]

wherein $R^7$ is hydrocarbon of 1–12 carbon atoms, X is halogen or hydrogen, and n is 1–3.

In the above-mentioned formula [VII], $R^7$ is hydrocarbon of 1–12 carbon atoms, for example, alkyl, cycloalkyl or aryl, including concretely methyl, ethyl, n-propyl, isopropyl, isobutyl, pentyl, hexyl, octyl, cyclopentyl, cyclohexyl, phenyl, tolyl, etc.

The organoaluminum compounds of the formula $R_n^7AlX_{3-n}$ include, in concrete, such compounds as mentioned below.

Trialkylaluminum such as trimethylaluminum, triethylaluminum, triisopropylaluminum, triisobutylaluminum, trioctylaluminum, tri-2-ethylhexylaluminum, etc;

alkenylaluminum such as isoprenylaluminum, etc;

dialkylaluminum halides such as dimethylaluminum chloride, diethylaluminum chloride, diisopropylaluminum chloride, diisobutylaluminum chloride, dimethylaluminum bromide, etc;

alkylaluminum sesquihalides such as methylaluminum sesquichloride, ethylaluminum sesquichloride, isopropylaluminum sesquichloride, butylaluminum sesquichloride, ethylaluminum sesquibromide, etc;

alkylaluminum dihalides such as methylaluminum dichloride, ethylaluminum dichloride, isopropylaluminum dichloride, ethylaluminum dibromide, etc, and alkylaluminum hydride such as diethylaluminum hydride and diisobutylaluminum hydride.

As the catalyst component [C], there may also be used a compound represented by the following formula:

$$R_n^7 AlY_{3-n} \quad [VIII]$$

in the formula [VIII] $R^7$ is as defined above, Y is $-OR^8$, $-OSiR_3^9$, $-OAlR_2^{10}$, $-NR_2^{11}$, $-SiR_3^{12}$, or $-N(R^{13})AlR_2^{14}$, n is 1-2 and $R^8$, $R^9$, $R^{10}$ and $R^{14}$ are each methyl, ethyl, isopropyl, isobutyl, cyclohexyl, phenyl, etc; $R^{11}$ is hydrogen, methyl, ethyl, isopropyl, phenyl, trimethylsilyl, etc; and $R^{12}$ and $R^{13}$ are each methyl, ethyl, etc.

The organoaluminum compounds of the formula $R_n^7 AlY_{3-n}$ [VIII] include, in concrete, such compounds as mentioned below.

(i) Compounds of the formula $R_n^7 Al(OR^8)_{3-n}$ such as dimethylaluminum methoxide, diethylaluminum ethoxide, diisobutylaluminum methoxide, etc;

(ii) Compounds of the formula $R_n^7 Al(OSiR_3^9)_{3-n}$ such as $(C_2H_5)_2AlOSi(CH_3)_3$, $(iso\text{-}C_4H_9)_2AlOSi(CH_3)_3$, $(iso\text{-}C_4H_9)_2AlOSi(C_2H_5)_3$, etc;

(iii) Compounds of the formula $R_n^7 Al(OAlR_2^{10})_{3-n}$ such as $(C_2H_5)_2AlOAl(C_2H_5)_2$, $(iso\text{-}C_4H_9)_2AlOAl(iso\text{-}C_4H_9)_2$, etc;

(iv) Compounds of the formula $R_n^7 Al(NR_2^{11})_{3-n}$ such as $(CH_3)_2AlN(C_2H_5)_2$, $(C_2H_5)_2AlNHCH_3$, $(CH_3)_2AlNH(C_2H_5)$; $(C_2H_5)_2AlN(Si(CH_3)_3)_2$, $(iso\text{-}C_4H_9)_2AlN(Si(CH_3)_3)_2$, etc;

(v) Compounds of the formula $R_n^7 Al(SiR_3^{12})_{3-n}$ such as $(iso\text{-}C_4H_9)_2AlSi(CH_3)_3$, etc; and (iv) Compounds of the formula $$R^7{}_n Al(NAlR^{14}{}_2)_{3-n}$$
$$\quad\quad\quad |$$
$$\quad\quad\quad R^{13}$$

such as

Et₂AlNAlEt₂ and (iso-Bu)₂AlNAl(iso-Bu)₂.
    |                       |
   Me                 Et Of the organoaluminum compounds as exemplified in the formulas [VII] and [VIII], preferred are those having the formulas $R_3^7Al$, $R_n^7Al(OR^8)_{3-n}$ and $R_n^7Al(OAlR_2^{10})_{3-n}$, and particularly preferred are those having the above-mentioned formulas in which $R^7$ is isoalkyl and n is 2. These organoaluminum compounds may also be used in combination of two or more.

In the invention, water may be used as a catalyst component in addition to the above-mentioned catalyst components [A], [B] and [C]. Examples of water employable in the invention include water dissolved in the later-described polymerization solvent, adsorbed-water or water of crystallization contained in a compound or a salt useed for preparing the catalyst component [B].

The first catalyst for olefin polymerization according to the invention can be prepared by mixing the catalyst components [A] and [B] and if desired water as a catalyst component in an inert hydrocarbon solvent or an olefin medium.

The order of mixing each components is optional, but it is preferred that the organoaluminum oxy-compound [B] is mixed with water and then to the resulting mixture is added the transition metal compound [A].

The second catalyst for olefin polymerization according to the invention can be prepared by mixing the catalyst components [A], [B] and [C] and if desired water as a catalyst component in an inert solvent or an olefin medium.

The order of mixing each components is optional, but it is preferred that the organoaluminum oxy-compound [B] is mixed with the organoaluminum compound [C] and then to the resulting mixture is added the transition metal compound [A].

FIG. 1 illustrates steps of a process for preparing the first and second catalysts for olefin polymerization according to the invention.

In the mixing of the above-mentioned components, an atomic ratio of aluminum contained in the catalyst component [B] to the transition metal contained in the catalyst component [A] (Al/transition metal) is generally in the range of 10 to 10,000, preferably 20 to 5,000, and a concentration of the component [A] is generally in the range of about $10^{-8}$ to $10^{-1}$ mol/l, preferably $10^{-7}$ to $5 \times 10^{-2}$ mol/l.

In the second catalyst for olefin polymerization according to the invention, an atomic ratio of aluminum atom (Alc) contained in the catalyst component [C] to aluminum atom (AlB) contained in the catalyst component [B] (Al$_C$/Al$_B$) is generally in the range of 0.02 to 20, preferably 0.2 to 10.

In the case of using water as a catalyst component, a molar ratio of aluminum atom (AlB) contained in the catalyst component [B] to water (H₂O) is generally in the range of 0.5 to 50, preferably 1 to 40.

The above-mentioned each components may be mixed with each other in a polymerizer, or a mixture of those components having been prepared in advance may be introduced into the polymerizer. When those components are in advance mixed with each other, the mixing temperature is generally in the range of $-50°$ to $150°$ C., preferably $-20°$ to $130°$ C., and the contact period is in the range of 1 to 1,000 minutes, preferably 5 to 600 minutes. The temperature may be varied during the mixing procedure.

Concrete examples of the inert hydrocarbon solvents used for preparing the catalysts for olefin polymerization according to the invention include aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane; and mixtures thereof.

Next, the third and fourth catalysts for olefin polymerization according to the invention are illustrated below.

The third catalyst for olefin polymerization according to the invention comprises a particulate carrier, [A] a catalyst component of a transition metal compound having a transition metal atom in Group IVB of the periodic table, a ligand containing a —SO$_3$R group wherein R is an alkyl group, an alkyl group substituted with a halogen atom, an aryl group or an aryl group substituted with a halogen atom or an alkyl group, and a ligand having a cyclopentadienyl skeleton and [B] an organoaluminum oxy-compound, the transition metal compound [A] and the organoaluminum oxy-compound [B] being supported on the particulate carrier.

The fourth catalyst for olefin polymerization according to the invention comprises a solid catalyst component and [C] an organoaluminum compound, wherein the solid catalyst component comprises a particulate carrier, [A] a catalyst component of a transition metal compound having a transition metal atom in Group IVB of the periodic table, a ligand containing a —SO$_3$R group wherein R is an alkyl group, an alkyl group substituted with a halogen atom, an aryl group or an aryl group substituted with a halogen atom or an alkyl group, and a ligand having a cyclopentadienyl skeleton and [B] an organoaluminum oxy-compound, the transition metal compound [A] and the organoaluminum oxy-compound [B] being supported on the particulate carrier.

The carrier employable in the invention is a solid inorganic or organic compound in granules or fine particles having a particle size of 10 to 300 μm, preferably 20 to 200 μm. Of these carriers, porous oxides are preferable as inorganic compound carriers. Concrete examples of the porous oxides include $SiO_2$, $Al_2O_3$, MgO, $ZrO_2$, $TiO_2$, $B_2O_3$, CaO, ZnO, BaO, $ThO_2$, or a mixture of these compounds such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these carriers, preferred are those comprising at least one compound selected from the group consisting of $SiO_2$ and $Al_2O_3$ as a major component.

Furthermore, the above-mentioned inorganic compounds may also contain a small amount of a carbonate, a sulfate, a nitrate and an oxide such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $LiO_2$.

Moreover, there can be used organic compounds in granular solid or fine solid particles each having a particle size of 10 to 300 μm as carriers in the present invention. Examples of these organic compounds include (co)polymers containing, as the main component, an α-olefin of 2 to 14 carbon atoms, such as ethylene, propylene, 1-butene and 4-methyl-1-pentene; polymers or copolymers containing, as the main component, vinylcyclohexane or styrene; and ring opening polymers of norbornene.

The particulate carriers may contain hydroxyl group or water, and in this case, the amount of the surface hydroxyl group is not less than 1.0 wt. %, preferably in the range of 1.5 to 4.0 wt. %, more preferably 2.0 to 3.5 wt. %, and the amount of water is not less than 1.0 wt. %, preferably in the range of 1.2 to 20 wt. %, more preferably 1.4 to 15 wt. %. The water contained in the particulate carrier means water adsorbed on the surface of the particulate carrier.

The amount of the surface hydroxyl group contained in the particulate carrier can be determined in the following manner. That is, the carrier is dried at 200° C. under a normal pressure in a stream of nitrogen, and the obtained weight of the carrier is set to X (g). Further, the carrier is fired at 1,000° C. for 20 hours to give a fired product in which the surface hydroxyl group have vanished, and the obtained weight of the carrier is set to Y (g). Thus obtained X and Y are introduced into the following formula to obtain the weight of the surface hydroxyl group.

Hydroxyl group (wt. %)={(X−Y)/X}×100

The weight of water contained in the particulate carrier can be weighed by means of a heat loss process. In the invention, weight loss of carrier after drying at 200° C. for 4 hours in a stream of a dry gas such as dry air or dry nitrogen is a weight of adsorbed water.

If the particulate carrier containing adsorbed water and surface hydroxyl group of specific weight is used, there can be obtained a solid catalyst for olefin polymerization capable of producing an olefin polymer having excellent particle properties with high polymerization activities.

Examples of the transition metal compound [A] used in the third and fourth catalysts for olefin polymerization according to the invention are the aforementioned transition metal compounds [A] used in the first and second catalysts for olefin polymerization.

Likewise, examples of the organoaluminum oxy-compound [B] used in the third and fourth catalysts for olefin polymerization are the aforementioned organoaluminum oxy-compounds [B] used in the first and second catalysts for olefin polymerization.

Further, examples of the organoaluminum compound [C] used in the fourth catalyst for olefin polymerization are the aforementioned organoaluminum compound [C] used in the second catalyst for olefin polymerization.

In the third and fourth Catalysts, such water as described with respect to the first and second catalysts can be also employed in addition to the above-mentioned catalyst components.

The third catalyst for olefin polymerization according to the invention can be prepared by mixing and contacting the particulate carrier and the catalyst components [A] and [B] and if desired water with each other in an inert hydrocarbon solvent or an olefin medium. The component [C] may be further added after the mixing procedure to prepare the fourth catalyst of the invention.

The order of adding each components is optional, but it is preferable that the particulate carrier and the organoaluminum oxy-compound [B] are mixed and brought into contact with each other, and then the transition metal compound [A] is brought into contact, and thereafter if desired water is brought into contact with the resulting mixture. Otherwise, a mixture of the organoaluminum oxy-compound [B] and the transition metal compound [A] is mixed and brought into contact with the particulate carrier, and then if desired, water is brought into contact with the resulting mixture. Alternatively, the particulate carrier, the organoaluminum oxy-compound [B] and water are mixed and brought into contact with each other, and then the transition metal compound [A] is brought into contact with the resulting mixture.

Figure 2:
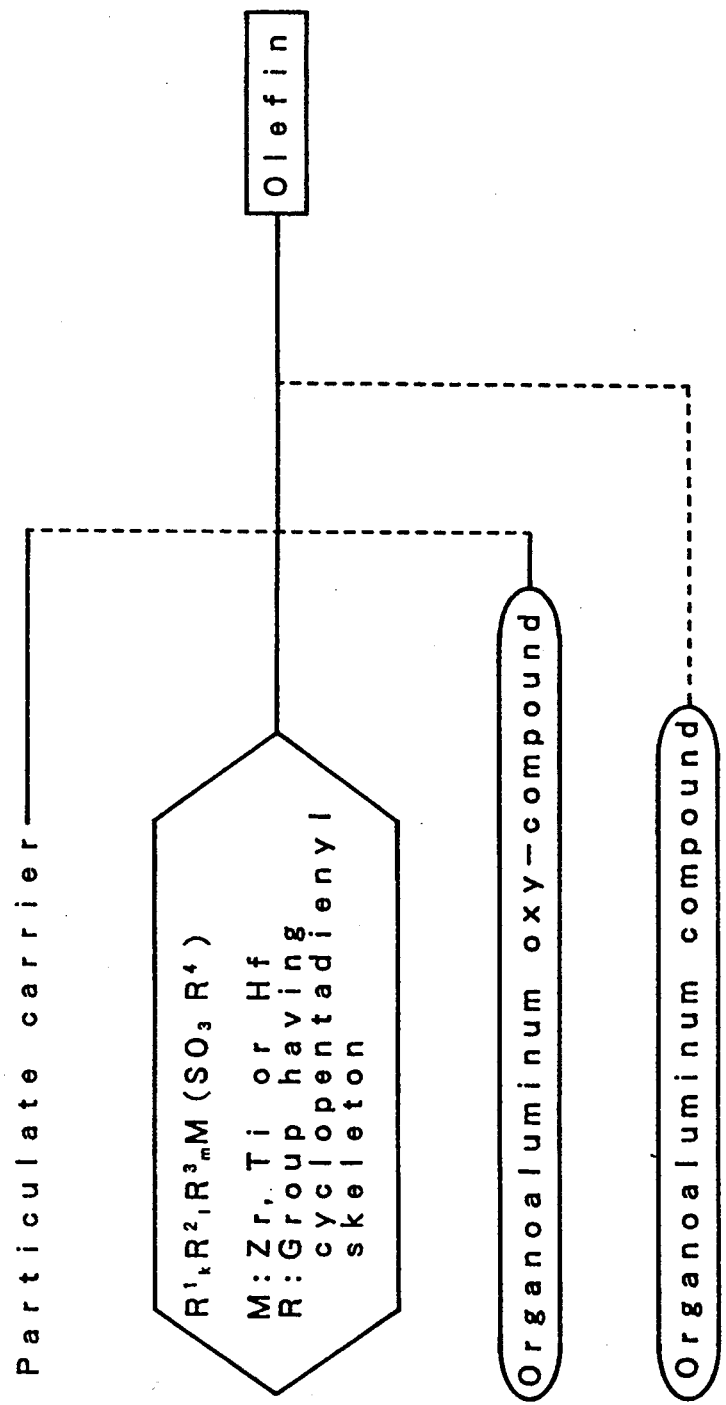

FIG. 2 illustrates steps of a process for preparing the third and fourth catalysts for olefin polymerization according to the invention.

In the mixing of the above-mentioned components, the catalyst component [A] is generally used in an amount of $10^{-5}$ to $5 \times 10^{-3}$ mol, preferably $5 \times 10^{-5}$ to $10^{-3}$ mol, per 1 g of the particulate carrier, and a concentration of the component [A] is generally in the range of about $10^{-4}$ to $2\times 10^{-2}$ mol/l, preferably $2\times 10^{-4}$ to $10^{-2}$ mol/l. An atomic ratio of aluminum contained in the catalyst component [B] to the transition metal contained in the catalyst component [A] (Al/transition metal) is generally in the range of 10 to 3,000, preferably 20 to 2,000.

In the case of using water as a catalyst component, a molar ratio of aluminum atom (AlB) contained in the catalyst component [B] to water (H$_2$O) is generally in the range of 0.5 to 50, preferably 1 to 40.

The temperature in the above mixing procedure is generally in the range of $-50°$ to $150°$ C., preferably $-20°$ to $120°$ C., and the contact period is in the range of 1 to 1,000 minutes, preferably 5 to 600 minutes. The temperature may be varied during the mixing procedure.

The fourth catalyst for olefin polymerization according to the invention comprises the above-mentioned third catalyst and the organoaluminum compound [C]. The organoaluminum compound [C] is used generally in an amount of not more than 500 mol, preferably in the range of 5 to 200 mol, per 1 gram atom of the transition metal atom.

The catalysts for olefin polymerization according to the invention may contain other additives which are useful for olefin polymerization in addition to the above components.

As the inert hydrocarbon medium employable for preparing the third and fourth catalysts for olefin polymerization according to the invention, there can be exemplified the similar media to those used for preparing the aforementioned first and second catalysts.

Next, the fifth and sixth catalysts for olefin polymerization according to the invention are described below.

The fifth catalyst for olefin polymerization according to the invention comprises a particulate carrier, [A] a catalyst component of a transition metal compound having a transition metal atom in Group IVB of the periodic table, a ligand containing a —SO$_3$R group wherein R is an alkyl group, an alkyl group substituted with a halogen atom, an aryl group or an aryl group substituted with a halogen atom or an alkyl group, and a ligand having a cyclopentadienyl skeleton, [B] an organoaluminum oxy-compound, and an olefin polymer prepared by prepolymerization.

The sixth catalyst for olefin polymerization according to the invention comprises a particulate carrier, [A] a catalyst component of a transition metal compound having a transition metal atom in Group IVB of the periodic table, a ligand containing a —SO$_3$R group wherein R is an alkyl group, an alkyl group substituted with a halogen atom, an aryl group or an aryl group substituted with a halogen atom or an alkyl group, and a ligand having a cyclopentadienyl skeleton, [B] an organoaluminum oxy-compound, [C] an organoaluminum compound, and an olefin polymer prepared by prepolymerization.

The particulate carrier, the transition metal compound [A], the organoaluminum oxy-compound [B] and the organoaluminum compound [C] used in the above catalysts for olefin polymerization are similar to those described before. Water can be also employed for these fifth and sixth catalysts.

These fifth catalyst for olefin polymerization according to the invention can be prepared by mixing and contacting the particulate carrier, the component [A] and the component [B] and if desired water with each other in an inert hydrocarbon solvent or an olefin medium to give a solid catalyst, and then prepolymerizing a small amount of olefin with the solid catalyst.

The component [C] can be also added after the mixing procedure.

The sixth catalyst for olefin polymerization according to the invention comprises the above-mentioned fifth catalyst and the organoaluminum compound [C].

The order of adding each components is optional, but it is preferable that the particulate carrier and the organoaluminum oxy-compound [B] are mixed and brought into contact with each other, and then the transition metal compound [A] is brought into contact, and thereafter if desired, water is brought into contact with the resulting mixture. Otherwise, a mixture of the organoaluminum oxy-compound [B] and the transition metal compound [A] is mixed and brought into contact with the particulate carrier, and then if desired water is brought into contact with the resulting mixture. Alternatively, the particulate carrier, the organoaluminum oxy-compound [B] and water are mixed and brought into contact with each other, and then the transition metal compound [A] is brought into contact with the resulting mixture.

FIG. 3 illustrates steps of a process for preparing the fifth and sixth catalysts for olefin polymerization according to the invention.

In the mixing of the above-mentioned components, the catalyst component [A] is generally used in an amount of $10^{-5}$ to $5\times 10^{-3}$ mol, preferably $5\times 10^{-5}$ to $10^{-3}$ mol, per 1 g of the particulate carrier, and a concentration of the component [A] is generally in the range of about $10^{-4}$ to $2\times 10^{-2}$ mol/l, preferably $2\times 10^{-4}$ to $10^{-2}$ mol/l. An atomic ratio of aluminum contained in the catalyst component [B] to the transition metal contained in the catalyst component [A] (Al/transition metal) is generally in the range of 10 to 3,000, preferably 20 to 2,000.

In the case of using water as a catalyst component, a molar ratio of aluminum atom (AlB) contained in the catalyst component [B] to water (H$_2$O) is generally in the range of 0.5 to 50, preferably 1 to 40.

The temperature in the above mixing procedure is generally in the range of $-50°$ to $150°$ C. preferably $-20°$ to $120°$ C. and the contact period is in the range of 1 to 1,000 minutes, preferably 5 to 600 minutes. The temperature may be varied during the mixing procedure.

The fifth catalyst for olefin polymerization according to the invention can be prepared by prepolymerizing olefin in the presence of the above-mentioned each components. In the prepolymerization, the catalyst component [A] is used in an amount of $10^{-5}$ to $2\times 10^{-2}$ mol/l, preferably $5\times 10^{-5}$ to $10^{-2}$ mol/l, the prepolymerization temperature is generally in the range of $-20°$ to $80°$ C., preferably $0°$ to $50°$ C., and the prepolymerization period is generally in the range of 0.5 to 100 hours, preferably 1 to 50 hours.

The olefin used in the prepolymerization is selected from olefins used for polymerization, but preferred are the same monomer as that for polymerization or a mixture of said monomer and $\alpha$-olefin.

In the catalyst for olefin polymerization obtained as above, the transition metal atom is supported on the particulate carrier in an amount of about $5\times 10^{-6}$ to $10^{-3}$ g atom, preferably $10^{-5}$ to $3\times 10^{-4}$ g atom, per 1 g of the particulate carrier, and the aluminum atom is supported on the particulate carrier in an amount of about $10^{-3}$ to $10^{-1}$ g atom, preferably $2\times 10^{-3}$ to $5 \times 10^{-2}$ g atom, per 1 g of the particulate carrier. Further, the weight of the polymer prepared by the prepolymerization is in the range of about 0.1 to 500 g, preferably 0.3 to 300 g, more preferably 1 to 100 g, based on 1 g of the particulate carrier.

The sixth catalyst for olefin polymerization according to the invention comprises the above-mentioned fifth catalyst and the organoaluminum compound [C]. The organoaluminum compound [C] is used generally in an amount of not more than 500 mol, preferably in the range of 5 to 200 mol, per 1 gram atom of the transition metal atom.

The catalysts for olefin polymerization according to the invention may contain other additives which are useful for olefin polymerization in addition to the above components.

As the inert hydrocarbon medium employable for preparing the fifth and sixth catalysts for olefin polymerization according to the invention, there can be exemplified the similar media to those used for preparing the aforementioned first and second catalysts.

The polymerization process of the invention is described below.

In the invention, olefin is polymerized in the presence of the above-mentioned catalysts for olefin polymerization.

The polymerization of olefin can be carried out in any process of liquid phase polymerization (e.g., suspension polymerization and solution polymerization) and gas phase polymerization. In the liquid phase polymerization, the same inert hydrocarbon solvent as that used for the preparation of the catalysts can be employed, or olefin per se can be employed as the solvent.

When the polymerization of olefin is conducted using the third or fourth catalyst for olefin polymerization according to the invention, the catalyst component [A] is used in an amount generally $10^{-8}$ to $10^{-1}$ g atom/l, preferably $10^{-7}$ to $5 \times 10^{-2}$ g atom/l, in terms of a concentration of the transition metal atom in the polymerization reaction system. In this polymerization, aluminoxane may be employed, if desired.

In the case of conducting the polymerization of olefin using the catalysts containing a prepolymerized olefin, as in the case of the fifth and sixth catalysts of the invention, the transition metal compound of the catalyst component [A] is used generally in an amount of $10^{-8}$ to $10^{-3}$ g atom, preferably $10^{-7}$ to $10^{-4}$ g atom, in terms of transition metal atom, per 1 liter of polymerization volume. In this polymerization, an organoaluminum compound or aluminoxane may be employed, if desired. Examples of the organoaluminum compounds used herein are the similar compounds to the aforementioned catalyst component [C]. The amount thereof preferably is in the range of 0 to 500 mol per 1 gram atom of the transition metal atom.

The temperature for olefin polymerization is generally in the range of $-50°$ to $100°$ C. preferably $0°$ to $90°$ C. in the case of slurry polymerization; it is generally in the range of $0°$ to $250°$ C. preferably $20°$ to $200°$ C. in the case of solution polymerization; and it is generally in the range of $0°$ to $120°$ C., preferably $20°$ to $100°$ C., in the case of gas phase polymerization. The polymerization pressure is generally in the range of a normal pressure to 100 kg/cm$^2$, preferably a normal pressure to 50 kg/cm$^2$. The polymerization reaction may be performed by any of a batch process, a semicontinuous process and a continuous process. Further, it is also possible to perform the polymerization in two or more stages different in the reaction conditions.

The molecular weight of the obtained olefin polymer can be adjusted by allowing water to exist in the polymerization system or by varying the polymerization temperature.

Examples of the olefins which can be polymerized by using the catalysts for olefin polymerization include ethylene and α-olefins of 3–20 carbon atoms such as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene; and cyclo-olefins of 3–20 carbon atoms such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene. Also employable are styrene, vinylcyclohexane, diene, etc.

The present inventors have energetically studied on development of the novel catalysts as mentioned above, and on this way, we have developed a novel transition metal compound employable as the catalyst component [A] of the invention. If this novel transition metal compound is used as the component [A], a catalyst having high catalytic activities for olefin polymerization can be obtained.

The novel transition metal compound is described in more detail below. 5 This novel transition metal compound of the invention is represented by the following formula [IX].

In the formula [IX], M is a transition metal in Group IVB of the periodic table, each of Cp$^1$ and Cp$^2$ is a group having a cyclopentadienyl skeleton, said group having a cyclopentadienyl skeleton may have a substituent group, Cp$^1$ and Cp$^2$ may be linked to each other through an alkylene group, a substituted alkylene group, a silylene group or a substituted silylene group, R$^1$ is an alkyl group, an alkyl group substituted with a halogen atom, an aryl group or an aryl group substituted with a halogen atom or an alkyl group, X is —SO$_3$R$_1$ a halogen atom, R$^1$, OR$^1$, NR$_n^1$, S(O)$_q$R$^1$, SiR$_3^1$ or P(O)$_q$R$_3^1$, n is 1, 2 or 3 and q is 0, 1 or 2 Preferably, X is —SO$^3$R$^1$, —OR, —NR$_1^1$ or a halogen atom.

M in the formula [IX] is a transition metal in Group IVB of the periodic table, and in concrete it is zirconium, titanium or hafnium.

Examples of the group having a cyclopentadienyl skeleton include cyclopentadienyl group; alkyl-substituted cyclopentadienyl group such as methylcyclopentadienyl group, 5 ethylcyclopentadienyl group, n-butylcyclopentadienyl group, dimethylcyclopentadienyl group, trimethylcyclopentadienyl group and pentamethylcyclopentadienyl group; indenyl group; and fluorenyl group. Of these, preferred are alkyl-substituted cyclopentadienyl group and indenyl group.

Examples of the alkylene group include ethylene group and propylene group.

Examples of the substituted alkylene group include isopropylidene group and diphenylmethylene group, and an example of the substituted silylene group is dimethylsilylene group.

Examples of the alkyl group include methyl group, ethyl group, propyl group, isopropyl group and butyl group, and examples of the aryl group include phenyl group and tolyl group.

The halogen is fluorine, chlorine, bromine or iodine.

The transition metal compound represented by the formula [IX] is very stable, and when used as a catalyst for olefin polymerization with an organoaluminum oxycompound, it shows high activities for olefin polymerization.

Concrete examples of the transition metal compounds represented by the formula [IX] are given below.

Bis(cyclopentadienyl)-zirconium (IV)-bis(methanesulfonate),
Bis(cyclopentadienyl)-zirconium (IV)-bis(p-toluenesulfonate),
Bis(cyclopentadienyl)-zirconium (IV)-bis(trifluoromethanesulfonate),
Bis(cyclopentadienyl)-zirconium (IV)-trifluoromethanesulfonate monochloride,
Bis(cyclopentadienyl)-zirconium (IV)-bis(benzenesulfonate),
Bis(cyclopentadienyl)-zirconium (IV)-bis(2,4,6-trimethylbenzenesulfonate),
Bis(cyclopentadienyl)-zirconium (IV)-bis(2,4,6-triisopropylbenzenesulfonate),
Bis(cyclopentadienyl)-zirconium (IV)-bis(pentafluorobenzenesulfonate),
Bis(cyclopentadienyl)-zirconium (IV)-(benzenesulfonate) monochloride,
Bis(cyclopentadienyl)-zirconium (IV)-(2,4,6-trimethylbenzenesulfonate) monochloride,
Bis(cyclopentadienyl)-zirconium (IV)-(2,4,6-triisopropylbenzenesulfonate) monochloride,
Bis(cyclopentadienyl)-zirconium (IV)-(pentafluorobenzenesulfonate) monochloride,
Bis(cyclopentadienyl)-zirconium (IV)-(etoxy) (trifluoromethanesulfonate),
Bis(methylcyclopentadienyl)-zirconium (IV)-bis(trifluoromethanesulfonate),
Bis(methylcyclopentadienyl)-zirconium (IV)-trifluoromethanesulfonate monochloride,
Bis(1,3-dimethylcyclopentadienyl)-zirconium (IV)-bis(-trifluoromethanesulfonate),
Bis(1,3-dimethylcyclopentadienyl)-zirconium (IV)-trifluoromethanesulfonate monochloride,
Bis(1,3-dimethylcyclopentadienyl)-zirconium (IV)-bis(-benzenesulfonate),
Bis(1,3-dimethylcyclopentadienyl)-zirconium (IV)-bis(p-toluenesulfonate),
Bis(1,3-dimethylcyclopentadienyl)-zirconium (IV)-bis(2,4,6-trimethylbenzenesulfonate),
Bis(1,3-dimethylcyclopentadienyl)-zirconium (IV)-bis(2,4,6-triisopropylbenzenesulfonate),
Bis(1,3-dimethylcyclopentadienyl)-zirconium (IV)-bis(-pentafluorobenzenesulfonate),
Bis(1,3-dimethylcyclopentadienyl)-zirconium (IV)-(benzenesulfonate) monochloride,
Bis(1,3-dimethylcyclopentadienyl)-zirconium (IV)-(2,4,6-trimethylbenzenesulfonate) monochloride,
Bis(1,3-dimethylcyclopentadienyl)-zirconium (IV)-(2,4,6-triisopropylbenzenesulfonate) monochloride,
Bis(1,3-dimethylcyclopentadienyl)-zirconium (IV)-(pentafluorobenzenesulfonate) monochloride,
Bis(1,3-dimethylcyclopentadienyl)-zirconium (IV)-(trifluoromethanesulfonate)dimethylamide,
Bis(1,3,5-trimethylcyclopentadienyl)-zirconium (IV)-bis(trifluoromethanesulfonate),
Bis(1,3,5-trimethylcyclopentadienyl)-zirconium (IV)-trifluoromethanesulfonate monochloride,
Ethylenebis(indenyl)-zircon lure (IV)-bis(trifluoromethanesulfonate),
Ethylenebis(indenyl)-zirconium (IV)-bis(methanesulfonate),
Ethylenebis(indenyl)-zirconium (IV)-bis(p-toluenesulfonate),
Ethylenebis(indenyl)-zirconium (IV)-bis(p-chlorobenzenesulfonate),
Ethylenebis(indenyl)-zirconium (IV)-trifluoromethanesulfonate monochloride,
Ethylenebis(indenyl)-zirconium (IV)-trifluoromethanesulfonate monobromide,
Ethylenebis(indenyl)-zirconium (IV)-trifluoromethanesulfonate monofluoride,
Ethylenebis(indenyl)-zirconium (IV)-trifluoromethanesulfonate monoiodide,
Ethylenebis(indenyl)-zirconium (IV)-methanesulfonate monochloride,
Ethylenebis(indenyl)-zirconium (IV)-p-toluenesulfonate monochloride,
Ethylenebis(indenyl)-zirconium (IV)-bis(benzenesulfonate),
Ethylenebis(indenyl)-zirconium (IV)-bis(2,4,6-trimethylbenzenesulfonate),
Ethylenebis(indenyl)-zirconium (IV)-bis(2,4,6-triisopropylbenzenesulfonate),
Ethylenebis(indenyl)-zirconium (IV)-bis(pentafluorobenzenesulfonate),
Ethylenebis(indenyl)-zirconium (IV)-(benzenesulfonate) monochloride,
Ethylenebis(indenyl)-zirconium (IV)-(2,4,6-trimethylbenzenesulfonate) monochloride,
Ethylenebis(indenyl)-zirconium (IV)-(2,4,6-triisopropylbenzenesulfonate) monochloride,
Ethylenebis(indenyl)-zirconium (IV)-(pentafluorobenzenesulfonate) monochloride,
Ethylenebis(indenyl)-hafnium (IV)-bis(trifluoromethanesulfonate),
Ethylenebis(indenyl)-hafnium (IV)-bis(methanesulfonate),
Ethylenebis(indenyl)-hafnium (IV)-bis(p-toluenesulfonate),
Ethylenebis(indenyl)-hafnium (IV)-bis(p-chlorobenzenesulfonate),
Ethylenebis(indenyl)-hafnium (IV)-trifluoromethanesulfonate monochloride,
Ethylenebis(indenyl)-hafnium (IV)-trifluoromethanesulfonate monobromide,
Ethylenebis(indenyl)-hafnium (IV)-trifluoromethanesulfonate monofluoride,
Ethylenebis(indenyl)-hafnium (IV)-trifluoromethanesulfonate monoiodide,
Ethylenebis(indenyl)-hafnium (IV)-methanesulfonate monochloride,
Ethylenebis(indenyl)-hafnium (IV)-p-toluenesulfonate monochloride,
Ethylenebis(indenyl)-titanium (IV)-bis(trifluoromethanesulfonate),
Ethylenebis(indenyl)-titanium (IV)-bis(methanesulfonate),
Ethylenebis(indenyl)-titanium (IV)-bis(p-toluenesulfonate),
Ethylenebis(indenyl)-titanium (IV)-bis(p-chlorobenzenesulfonate),
Ethylenebis(indenyl)-titanium (IV)-trifluoromethanesulfonate monochloride, Ethylenebis(indenyl)-titanium (IV)-trifluoromethanesulfonate monobromide,
Ethylenebis(indenyl)-titanium (IV)-trifluoromethanesulfonate monofluoride,
Ethylenebis(indenyl)-titanium (IV)-trifluoromethanesulfonate monoiodide,
Ethylenebis(indenyl)-titanium (IV)-methanesulfonate monochloride,
Ethylenebis(indenyl)-titanium (IV)-p-toluenesulfonate monochloride,
Dimethylsilylbis(indenyl)-zirconium (IV)-bis(trifluoromethanesulfonate),
Dimethylsilylbis(indenyl)-zirconium (IV)-bis(methanesulfonate),
Dimethylsilylbis(indenyl)-zirconium (IV)-bis(p-toluenesulfonate),
Dimethylsilylbis(indenyl)-zirconium (IV)-bis(p-chlorobenzenesulfonate),
Dimethylsilylbis(indenyl)-zirconium (IV) trifluoromethanesulfonate monochloride,
Dimethylsilylbis(indenyl)-zirconium (IV)-trifluoromethanesulfonate monobromide,
Dimethylsilylbis(indenyl)-zirconium (IV)-trifluoromethanesulfonate monofluoride,
Dimethylsilylbis(indenyl)-zirconium (IV)-trifluoromethanesulfonate monoiodide,
Dimethylsilylbis(indenyl)-zirconium (IV)-methanesulfonate monochloride,
Dimethylsilylbis (indenyl)-zirconium (IV)-p-toluenesulfonate monochloride,
Dimethylsilylbis(indenyl)-zirconium (IV)-bis(benzenesulfonate),
Dimethylsilylbis(indenyl)-zirconium (IV)-bis(2,4,6-trimethylbenzenesulfonate),
Dimethylsilylbis(indenyl)-zirconium (IV)-bis(2,4,6-triisopropylbenzenesulfonate),
Dimethylsilylbis(indenyl)-zirconium (IV)-bis(pentafluorobenzenesulfonate),
Dimethylsilylbis(indenyl)-zirconium (IV)-(benzenesulfonate) monochloride,
Dimethylsilylbis(indenyl)-zirconium (IV)-(2,4,6-trimethylbenzenesulfonate) monochloride,
Dimethylsilylbis(indenyl)-zirconium (IV)-(2,4,6-triisopropylbenzenesulfonate) monochloride,
Dimethylsilylbis(indenyl)-zirconium (IV)-(pentafluorobenzenesulfonate) monochloride,
Diphenylmethylenebis(indenyl)-zirconium (IV)-bis(trifluoromethanesulfonate),
Diphenylmethylenebis(indenyl)-zirconium (IV)-bis(methanesulfonate),
Diphenylmethylenebis(indenyl)-zirconium (IV)-bis(p-toluenesulfonate),
Diphenylmethylenebis(indenyl)-zirconium (IV)-bis(p-chlorobenzenesulfonate),
Diphenylmethylenebis(indenyl)-zirconium (IV)-trifluoromethanesulfonate monochloride,
Diphenylmethylenebis(indenyl)-zirconium (IV)-trifluoromethane sulfonate monobromide,
Diphenylmethylenebis(indenyl)-zirconium (IV)-trifluoromethanesulfonate monofluoride,
Diphenylmethylenebis(indenyl)-zirconium (IV)-trifluoromethanesulfonate monoiodide,
Diphenylmethylenebis(indenyl)-zirconium (IV)-methanesulfonate monochloride,
Diphenylmethylenebis(indenyl)-zirconium (IV)-p-toluenesulfonate monochloride,
Diphenylsilylbis(indenyl)-zirconium (IV)-bis(benzenesulfonate),
Diphenylsilylbis(indenyl)-zirconium (IV)-bis(2,4,6-trimethylbenzenesulfonate),
Diphenylsilylbis(indenyl)-zirconium (IV)-bis(2,4,6-triisopropylbenzenesulfonate),
Diphenylsilylbis(indenyl)-zirconium (IV)-(pentafluorobenzenesulfonate),
Diphenylsilylbis(indenyl)-zirconium (IV)-(benzenesulfonate) monochloride,
Diphenylsilylbis(indenyl)-zirconium (IV)-(2,4,6-trimethylbenzenesulfonate) monochloride,
Diphenylsilylbis(indenyl)-zirconium (IV)-(2,4,6-triisopropylbenzenesulfonate) monochloride, and
Diphenylsilylbis(indenyl)-zirconium (IV)-(pentafluorobenzenesulfonate) monochloride.

The novel transition metal compound of the invention can be prepared from a compound represented by the following formula [X] and a sulfonic acid derivative represented by the following formula [XI].

In the formula [X], M is a transition metal in Group IVB of the periodic table, and this group having a cyclopentadienyl skeleton may have a substituent group. $Cp^1$ and $Cp^2$ may be linked to each other through an alkylene group, a substituted alkylene group, a silylene group or a substituted silylene group. Y is $SO_3R$, a halogen atom, R, OR, $NR_n$, $S(O)_qR$, $SiR_3$ or $P(o)_qR_3$, n is 1, 2 or 3, and q is 0, 1 or 2. R is an alkyl group, an alkyl group substituted with a halogen atom, an aryl group or an aryl group substituted with a halogen atom or an alkyl group.

In the formula [XI], $R^1$ is an alkyl group, an alkyl group substituted with a halogen atom, an aryl group, or an aryl group substituted with a halogen atom or an alkyl group. Z is an Ag, alkali metal (e.g., Na and K) or an ammonium group (e.g., triethyl ammonium and tri (n-octyl) ammonium).

The preparation of the transition metal compound from the compound represented by the formula [X] and the sulfonic acid derivative represented by the formula [XI] is carried out in accordance with the following reaction formula.

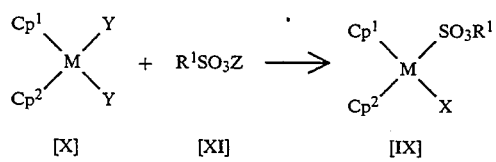

In the formula [IX], X is $-SO_3R_1$ or the same halogen atom as that of Y.

The reaction conditions in this reaction varies depending upon the composition of the aimed compound [IX], but the compound [XI] is generally used in an amount of 1-10 times by mol, preferably 1-3 times by mole, of the amount of the compound [X]. The reaction temperature is generally in the range of −20 to 180° C., preferably 0° to 130° C., and the reaction time is generally in the range of 0.5 to 48 hours, preferably 2 to 12 hours.

Suitable solvents used in the reaction include aliphatic hydrocarbons such as hexane and decane; aromatic hydrocarbons such as benzene, toluene and xylene; halogenated hydrocarbons such as carbon tetrachloride, chloroform and methylene chloride; and ketones such as acetone and methyl isobutyl ketone; and acetonitrile. Of these, toluene and xylene are particularly preferred. Such hydrocarbon solvent as mentioned above is used generally in an amount of 1–1,000 times, preferably 50–500 times, of the amount of the compound [X].

The above-described process gives the desired transition metal compound in high yield.

The transition metal compound obtained as above can be isolated or purified by filtering it and then concentrating the resulting filtrate to recrystallize or by subjecting it to sublimation.

EFFECT OF THE INVENTION

The catalysts for olefin polymerization according to the invention can give olefin polymers of excellent particle properties with high polymerization activities even when applied to a suspension polymerization and a gas phase polymerization, and further can give copolymers having a narrow composition distribution when two or more monomers are copolymerized.

Moreover, the present invention provides a novel transition metal compound favorably used for the above-mentioned catalysts for olefin polymerization.

EXAMPLE

The present invention is illustrated below with reference to examples, but it should be construed that the present invention is in no way limited to those examples.

The molecular weight distribution (Mw/Mn), melt flow rate (MFR), intrinsic viscosity [η], tacticity (mm triad fractions), ethylene content, reduced specific viscosity (RSV), of polymers in this specification are measured in the following manner. Further, the composition distribution is estimated by "Amount of n-decan solubule portion of polymer".

Molecular Weight Distribution

The molecular weight distribution (Mw/Mn) was measured in accordance with "Gel Permeation Chromatography" written by Takeuchi, issued by Maruzen Co., Ltd.

Melt Flow Rate

The melt flow rate was measured at 190° C. under a load of 2.16 kg in accordance with ASTM D785.

Intrinsic Viscosity [η]

The intrinsic viscosity was measured in decalin at 135° C., and expressed by dl/g.

Tacticity (mm Triad Fractions)

The isotactic fraction (mm triad fractions) in the propylene chain was determined based on $^{13}$C-NMR spectrum analysis. Test specimen was prepared by dissolving about 150 mg of a sample in a mixture liquid of hexachlorobutadiene and bihydrogenated benzene. $^{13}$C-NMR was measured by using a normal device of JEOLGX 500 under the conditions of a measuring frequency of 125.65 MHz, a spectrum width of 8,800 Hz, a pulse repetition period of 4.0 seconds, a pulse angle of 45° and a measuring temperature of 95° to 110° C.

Ethylene Content

The ethylene content in a copolymer was determined by $^{13}$C-NMR spectrum analysis of a sample prepared by homogeneously dissolving about 200 mg of the copolymer in 1 ml of hexachlorobutadiene in a sample tube having a diameter of 10 mmφ under the conditions of a measuring temperature of 120° C., a measuring frequency of 25.05 MHz, a spectrum width of 1,500 Hz, a pulse repetition period of 4.2 sec and a pulse width of 6 μsec.

Reduced Specific Viscosity (RSV)

The reduced specific viscosity was measured by dissolving a polymer in decalin of 135° C. in a concentration of 0.1 dl/g, and expressed by dl/g.

Amount of n-decane Soluble Portion of Polymer

The amount of a n-decane soluble portion of polymer was measured by dissolving about 3 g of said polymer in 450 ml of n-decane at 145° C. cooling the solution to 23° C. removing a n-decane insoluble portion by filtration, and recovering a n-decane soluble portion from the filtrate.

Synthesis of Transition Metal Compound

Example 1

Preparation of Bis(cyclopentadienyl)-zirconium (IV)-bis(methanesulfonate) (Compound No. 100)

Into a 300 ml glass reactor thoroughly purged with nitrogen were charged 100 ml of dry acetonitrile and 1.24 g (4.25 mmol) of zirconocene dichloride, and they were stirred at room temperature to give a homogeneous solution. To the mixed solution was added dropwise 50 ml of an acetonitrile solution containing 1.74 g (8.57 mmol) of silver methanesulfonate at room temperature over a period of 10 min, and the reaction was continued at room temperature for 2 hours. The produced salt was filtered over a glass filter in a stream of nitrogen, and the obtained filtrate was concentrated at a reduced pressure. Thus obtained solid was recrystallized with toluene, to obtain 1.04 g of a colorless needle crystal (yield: 60%, melting point: 145°–148° C.).

The results on the $^1$H-NMR spectrum analysis and the elemental analysis of the crystal obtained as above are set forth in Table 1.

Example 2

Preparation of Bis(cyclopentadienyl)-zirconium (IV)-bis(p-toluenesulfonate) (Compound No. 101)

Into a 200 ml glass reactor thoroughly purged with nitrogen were charged 50 ml of dry acetonitrile and 1.05 g (3.6 mmol) of zirconocene dichloride, and they were stirred at room temperature to give a homogeneous solution. To the mixed solution was added dropwise 100 ml of an acetonitrile solution containing 2.04 g (7.3 mmol) of silver p-toluenesulfonate at room temperature over a period of 10 min, and the reaction was continued at 60° C. for 2 hours. The produced salt was filtered over a glass filter in a stream of nitrogen, and the obtained filtrate was concentrated at a reduced pressure. Thus obtained solid was recrystallized with toluene, to obtain 1.39 g of a light-yellow white needle crystal (yield: 69%, melting point: 213°–216° C.).

The results on the $^1$H-NMR spectrum analysis and the elemental analysis of the crystal obtained as above are set forth in Table 1.

Example 3

Preparation of bis(cyclopentadienyl)-zirconium (IV)-bis (trifluoromethanesulfonate) (Compound No. 102)

Into a 1 liter glass reactor thoroughly purged with nitrogen were charged 250 ml of dry toluene and 0.73 g (2.5 mmol) of zirconocene dichloride, and they were stirred at room temperature to give a homogeneous solution. To the mixed solution was added dropwise 100 ml of a toluene solution containing 1.28 g (5.0 mmol) of silver trifluoromethanesulfonate at room temperature over a period of 30 min. The reaction liquid was stirred at room temperature for 3 hours, and then the reaction was continued at 60° C. for 4 hours. The produced salt was filtered over a glass filter in a stream of nitrogen, and the obtained filtrate was concentrated at a reduced pressure. Thus obtained solid was purified by means of sublimation ($1 \times 10^{-4}$ mmHg/100°–120° C.), to obtain 0.45 g of a white solid (yield: 35%, melting point: 205° C. (decomposition)).

The results on the $^1$H-NMR spectrum analysis and the elemental analysis of the white solid obtained as above are set forth in Table 1.

Example 4

Preparation of bis(cyclopentadienyl)-zirconium (IV)-trifluoromethanesulfonate monochloride (Compound No. 103)

The procedure of Example 3 was repeated except for using 1.46 g (5 mmol) of zirconocene dichloride and 1.54 g (6 mmol) of silver fluoromethanesulfonate, to obtain 0.96 g of a white solid (yield: 47%, melting point: 101° C. (decomposition)).

The results on the $^1$H-NMR spectrum analysis and the elemental analysis of the white solid obtained as above are set forth in Table 1.

Example 5

Preparation of bis(cyclopentadlenyl)-zirconium (IV)-bis(2,4,6-trimethylbenzenesulfonate) (Compound No. 104)

Into a 500 ml glass reactor thoroughly purged with nitrogen were charged 100 ml of dry acetonitrile and 1.58 g (5.4 mmol) of bis(cyclopentadienyl)-zirconium (IV)-dichloride, and they were stirred at room temperature to give a homogenous solution. To the mixed solution was added dropwise 50 ml of an acetonitrile solution containing 3.70 g (10.8 mmol) of silver 2,4,6-trimethylbenzenesulfonate at room temperature over a period of 10 min. Then, the temperature of the reaction system was raised to 60° C. After the reaction of 2 hours, the reaction liquid was cooled to room temperature. The produced salt was filtered. To the produced salt was added 300 ml of acetonitrile, and the mixture was stirred for 30 min. while refluxing. Thereafter, the mixture was filtrated by means of hot-filtration, and silver chloride was removed. Then the filtrate was concentrated at a reduced pressure. The concentrate was recrystallized with 100 ml of toluene, to obtain 1.2 g of a 5 needle crystal of bis(cyclopentadienyl)-zirconium (IV)-bis (2,4,6-trimethylbenzenesulfonate) (yield: 38% melting point: 250°–251° C.).

The results on the 'H-NMR spectrum analysis and the elemental analysis of the crystal obtained as above are set force in Table 1.

Example 6

Preparation of bis(methylcyclopentadienyl)-zirconium (IV)-bis(trifluoromethanesulfonate) (Compound No. 200)

The procedure of Example 3 was repeated except for using 1.60 g (5 mmol) of bis(methylcyclopentadienyl)-zirconium (IV)-dichloride instead of zirconocene dichloride and using 2.59 g (10 mmol) of silver trifluoromethanesulfonate, to obtain 0.55 g of an yellow crystal (yield: 20%, melting point: 85° C. (decomposition)).

The results on the $^1$H-NMR spectrum analysis and the elemental analysis of the crystal obtained as above are set forth in Table 1.

Example 7

Preparation of bis(methylcyclopentadienyl)-zirconium (IV)-trifluoromethanesulfonate monochloride (Compound No. 201)

The procedure of Example 3 was repeated except for using 1.53 g (4.8 mmol) of bis(methylcyclopentadienyl)-zirconium (IV)-dichloride instead of zirconocene dichloride and using 1.29 g (5.0 mmol) of silver trifluoromethanesulfonate, to obtain 1.44 g of an yellow crystal (yield: 69%, melting point: 78°–79° C.).

The results on the $^1$H-NMR spectrum analysis and the elemental analysis of the crystal obtained as above are set forth in Table 1.

Example 8

Preparation of bis(1,3-dimethylcyclopentadienyl)-zirconium (IV)-bis(trifluoromethanesulfonate) (Compound No. 202)

The procedure for obtaining the filtrate in Example 3 was repeated except for using 6.97 g (20 mmol) of bis(1,3-dimethylcyclopentadienyl)-zirconium (IV)-dichloride instead of zirconocene dichloride and using 10.53 g (41 mmol) of silver trifluoromethanesulfonate. The obtained filtrate was concentrated to give the resulting amount of 20 ml, and the precipitated solid was heated at 60° C. to dissolve again, and then gradually cooled to room temperature to be recrystallized. Thus, 7.52 g of an yellow crystal was obtained. The crystal was dissolved in 25 ml of toluene at 50° C., and gradually cooled to room temperature to be recrystallized. Thus, 4.77 g an yellow crystal was obtained (yield: 41%, melting point: 169°–171° C.).

The results on the $^1$H-NMR spectrum analysis and the elemental analysis of the crystal obtained as above are set forth in Table 1.

Example 9

Preparation of bis(1,3-dimethylcyclopentadienyl)zirconium (IV)-trifluoromethanesulfonate monochloride (Compound No. 203)

The procedure of Example 3 was repeated except for using 1.60 g (4.6 mmol) of bis(1,3-dimethylcyclopentadienyl)zirconium (IV)-dichloride instead of zirconocene dichloride and using 1.24 g (4.8 mmol) of silver trifluoromethanesulfonate, to obtain 0.25 g of an yellow crystal (yield: 12%, melting point: 110° C. (decomposition)).

The results on the ¹H-NMR spectrum analysis and the elemental analysis of the crystal obtained as above are set forth in Table 1.

Example 10

Preparation of ethylenebis(indenyl)-zirconium (IV)-bis(trifluoromethanesulfonate) (Compound No. 300)

Into a 1 liter glass reactor thoroughly purged with nitrogen were charged 600 ml of dry toluene and 88 g (4.5 mmol) of ethylenebis(indenyl)-zirconium (IV)-dichloride, and they were stirred at room temperature to give a homogeneous solution. To the mixed solution was added dropwise 100 ml of a toluene solution containing 2.34 g (9 mmol) of silver trifluoromethanesulfonate at room temperature over a period of 30 min. The reaction liquid was stirred at room temperature for 3 hours, and then the reaction was continued at 60° C. for 4 hours. The produced salt was filtered over a glass filter in a stream of nitrogen, and the obtained filtrate was concentrated at a reduced pressure. The obtained solid was recrystallized with 60 ml of toluene, to obtain 1.54 g of an orange crystal (yield: 53%, melting point: 180° C. (decomposition)).

The results on the ¹H-NMR spectrum analysis and the elemental analysis of the crystal obtained as above are set forth in Table 1.

Example 11

Preparation of ethylenebis(indenyl)-zirconium (IV)-trifluoromethanesulfonate monochloride (Compound No. 301)

The procedure of Example 10 was repeated except for dissolving 1.88 g (4.5 mmol) of ethylenebis(indenyl)-zirconium (IV)-dichloride in 700 ml of toluene, subjecting the resulting solution to react with 1.17 g of silver trifluoromethanesulfonate and recrystallizing the obtained solid with 60 ml of toluene, to obtain 0.44 g of an orange crystal (yield: 17% melting point: 235° C. (decomposition)).

The results on the ¹H-NMR spectrum analysis and the elemental analysis of the crystal obtained as above are set forth in Table 1.

Example 12

Preparation of bis(cyclopentadienyl)-zirconium (IV)-(ethoxy) (trifluoromethanesulfonate) (Compound No. 302)

Into a 500 ml glass reactor thoroughly purged with nitrogen were charged 350 ml of dry toluene and 5.27 g of bis(cyclopentadienyl)-zirconium (IV)-dichloride, and they were stirred at room temperature to give a homogeneous solution. To the mixed solution was added 1.16 ml of ethyl alcohol and then was further added slowly 3.77 ml of triethylamine. The temperature of the reaction system was raised to 50° C. After the reaction of 1 hour, the reaction system was cooled to room temperature, and the produced salt was removed by means of filtration. The filtrate was concentrated at a reduced pressure, and then to the concentrate was added 40 ml of hexane. The reaction system was cooled to −20° C. to obtain from the hexane layer 4.00 g of a white plate crystal of bis(cyclopentadienyl)-zirconium (IV)-(ethoxy) chloride (yield: 60%).

Into a 500 ml glass reactor thoroughly purged with nitrogen were charged 200 ml of dry toluene and 4.00 g of bis(cyclopentadienyl)-zirconium (IV)-(ethoxy) chloride, and they were stirred at 60° C. to give a homogeneous solution. To the mixed solution was dropwise added 74.4 ml of toluene solution of silver trifluoromethanesulfonate (0.16 mmol/ml) over a period of 1 hour. After the reaction of 1 hour, the reaction liquid was cooled to room temperature, and the produced salt was removed by means of filtration. The filtrate was concentrated at a reduced pressure, and then to the concentrate was added 50 ml of hexane. The reaction system was cooled to −20° C. to obtain from the hexane layer 2.40 g of a white crystal of bis(cyclopentadienyl)-zirconium (IV)-(ethoxy) (trifluoromethanesulfonate) (yield: 44%, melting point: 99°–100° C. (decomposition)).

The results on the ¹H-NMR spectrum analysis and the elemental analysis of the crystal obtained as above are set forth in Table 1.

Example 13

Preparation of bis(1,3-dimethylcyclopentadienyl)-zirconium (IV)-(trifluoromethanesulfonate) dimethylamide (Compound No. 303)

Into a 500 ml glass reactor thoroughly purged with nitrogen were charged 100 ml of dry hexane and n-butyl lithium (hexane solution of 1.62 M, 15.6 ml), and they were stirred at −10° C. To the reaction liquid was added 1.25 g of dimethylamine at −10° C. and stirred for 30 min. The temperature of the reaction system was raised to 0° C. After the reaction of 1 hour, nitrogen was blown into the reaction system to remove the residual dimethylamine. To the reaction liquid was dropwise added 200 ml of a toluene solution containing 3.66 g of bis(1,3-dimethylcyclopentadienyl) zirconium (IV)-dichloride over a period of 30 min, and the reaction liquid was stirred at 0° C. The temperature of the reaction system was raised to room temperature. After the reaction of 1 hour, the reaction liquid was heated at 95° C. for 6 hours, and the produced salt was removed by means of filtration. The filtrate was concentrated (about 20 ml). The precipitated solid was filtered, and the obtained brown solid was purified by means of sublimation (200° C. 0.5 mmHg), to obtain 0.60 g of a crystal of bis(1,3-dimethylcyclopentadienyl)-zirconium (IV)-(dimethylamide)chloride (yield: 18%).

Into a 500 ml glass reactor thoroughly purged with nitrogen were charged 100 ml of dry toluene and 1.00 g of bis(1,3-dimethylcyclopentadienyl)-zirconium (IV)-(dimethylamide)chloride, and they were stirred at room temperature to give a homogeneous solution. To the mixed solution was dropwise added 17.5 ml of toluene solution of silver trifluoromethanesulfonate (0.16 mmol/ml) over a period of 30 min. Then, the temperature of the reaction system was raised to 60° C. After the reaction of 1 hour, the reaction liquid was cooled to room temperature. Then, the produced salt was removed by means of filtration, and the filtrate was concentrated at a reduced pressure. The concentrate was recrystallized with a mixed solvent of toluene/hexane (5 ml/10 ml), to obtain 0.66 g of a crystal of bis(1,3-dimethylcyclopentadienyl)-zirconium (IV)-(trifluoromethanesulfonate)dimethylamide (yield: 50%, melting point: 95°–97° C.).

The results on the ¹H-NMR spectrum analysis and the elemental analysis of the crystal obtained as above are set forth in Table 1.

Example 14

Preparation of ethylenebis(indenyl)-hafnium (IV)-bis(trifluoromethanesulfonate) (Compound No. 400)

The procedure of Example 10 was repeated except for dissolving 0.80 g (1.58 mmol) of ethylenebis(indenyl)-hafnium (IV)-dichloride in 400 ml of toluene, subjecting the resulting solution to react with 0.82 g (3.16 mmol) of silver trifluoromethanesulfonate, and recrystallizing the obtained solid with 10 ml of toluene, to obtain 0.45 g of an yellow green crystal (yield: 39%, melting point: 225° C. (decomposition)).

The results on the $^1$H-NMR spectrum analysis and the elemental analysis of the crystal obtained as above are set forth in Table 1.

TABLE 1

| Compound No. | $^1$H-NMR spectrum (CDCl$_3$; ppm) | Elemental Analysis (wt %) | |
|---|---|---|---|
| | | Calculated value | Result |
| 100 | 2.95 (6H, S), 6.57(10H, S) | Zr:22.2, S:15.6 Cl:0 | Zr:21.3, S:14.8 Cl<0.1 |
| 101 | 2.44(6H, S), 6.44(10H, S) 7.28(4H, d, J=8Hz), 7.76(4H, d, J=8Hz) | Zr:16.2, S:11.4 Cl:0 | Zr:16.1, S:11.2 Cl<0.1 |
| 102 | 6.56(10H, S) | Zr:17.6, S:12.3 F:21.9, Cl:0 | Zr:17.7, S:11.6 F:20.9, Cl<0.1 |
| 103 | 6.50(10H, S) | Zr:22.5, S:7.9 F:14.0, Cl:8.7 | Zr:22.3, S:7.9 F:13.1, Cl:8.3 |
| 104 | 2.30(6H, S), 2.60(12H, S) 6.40(10H, .S), 6.92(4H, .S) | Zr:14.1, S:10.0 Cl:0 | Zr:14.0, S:10.2 Cl<0.1 |
| 200 | 2.30(6H, S), 6.30 (4H, d, J=2.9Hz) 6.38(4H, d, J=2.9Hz) | Zr:16.7, S:11.7 F:20.8, Cl:0 | Zr:15.4, S:11.1 F:18.7, Cl<0.1 |
| 201 | 2.30(6H, S), 6.30(4H, d, J=2.9Hz) 6.48(4H, d, J=2.9Hz) | Zr:21.0, S:7.4 F:13.1, Cl:8.2 | Zr:20.2, S:7.8 F:12.8, Cl:8.8 |
| 202 | 2.26(12H, S), 6.24(4H, D, J=2.9Hz) 6.44(2H, br, s) | Zr:15.9, S:11.1 F:19.81 Cl:0 | Zr:15.4, S:11.8 F:19.1, Cl<0.1 |
| 203 | 2.22(12H, S), 5.90(4H, d, J=2.9Hz) 6.22(2H, br, s) | Zr:19.7, S:6.9 F:12.3, Cl:7.7 | Zr:19.9, S:6.5 F:11.3, Cl:8.4 |
| 300 | 4.04(4H, S), 6.48(2H, d, J=3.6Hz) 6.88(2H, d, J=3.6Hz), 7.20–7.80(8H, m) | Zr:14.1, S:9.9 F:17.7, Cl;O | Zr:13.8, S:9.6 F:16.9, Cl<0.1 |
| 301 | 3.78(4H, S), 6.22(2H, d, J=3.6Hz) 6.60(2H, d, J=3.6Hz), 7.20–7.72(8H,m) | Zr:17.1, S:6.0 F:10.7, Cl:6.7 | Zr:16.7, S:6.3 F:10.4, Cl:6.9 |
| 302 | 1.20(t, 3H), 4.08(q, 2H) 6.43(S, 10H) | Zr:21.9, S:7.7 F:13.7, Cl:0 | Zr:21.6, S:7.3 F:13.0, Cl<0.1 |
| 303 | 2.0–2.6(m, 18H), 5.7–6.7(m, 6H) | Zr:19.4, S:6.8 F:12.1, Cl:0 | Zr:19.5, S:6.7 F:11.6, Cl<0.1 |
| 400 | 4.10(4H, S), 6.40(2H, d, J=3.6Hz) 6.80(2H, d, J=3.6Hz), 7.20–7.80(8H, m) | Hf:24.4, S:8.7 F:15.6, Cl:0 | Hf:25.1, S:9.0 F:14.7, Cl<0.1 |

Copolymerization of Ethylene/Propylene

Example 15

Into a pressure-resistant container of 10 liter were continuously supplied 5 l/hr of hexane, 364 Nl/hr of ethylene, 336 Nl/hr of propylene, 1.0 mg atom/hr (in terms of aluminum atom) of methylaluminoxane (obtained by firmly drying methylaluminoxane of Sheling Co., Ltd. and dissolving it in toluene) and 4.0 mg atom/hr (in terms of aluminum atom) of triisobutylaluminum. To the resulting mixture was added 0.0075 mg atom/hr (in terms of zirconium atom) of bis(1,3-dimethylcyclopentadienyl)-zirconium (IV)-bis(trifluoromethanesulfonate) (Compound No. 202), to conduct continuous polymerization reaction under the conditions of a temperature of 80° C., a total pressure of 7.8 kg/cm$^2$ and a retention time of 1 hour.

From the discharged polymer solution was removed hexane by means of steam distillation, and the resulting polymer was dried at 130° C. under a reduced pressure over a period of 1 night, to obtain 450 g of polymer per one hour (activity; 56000 g-polymer/mg-atom metal.hr).

Physical properties of the copolymer obtained as above are set forth in Table 2.

Example 16

Into a 1 liter glass reactor thoroughly purged with nitrogen was charged 500 ml of purified toluene, and a mixed gas of ethylene and propylene (ethylene/propylene: 40/60% by mol) was introduced into the reactor with stirring at 800 r.p.m. to hold the reaction system at 40° C. for 10 hours. Then, into the reactor was charged 1.25 mg atom (in terms of aluminum atom) of methylaluminoxane (obtained by firmly drying methylaluminoxane of Sheling Co., Ltd. and dissolving it in toluene), and Was further charged 0.0005 mg atom (in terms of zirconium atom) of bis(1,3-dimethylcyclopentadienyl)-zirconium (IV)-trifuloromethanesulfonate monochloride (Compound No. 203). The polymerization was conducted at 40° C. under a normal pressure for 30 min, then a small amount of isobutanol was added to the reaction system, and the polymerization was terminated. 5 After the reaction was complete, the obtained reaction liquid was introduced into an aqueous solution of dilute hydrochloric acid to remove catalyst residue. After the concentration of the toluene layer, the concentrate was dried at a reduced pressure at 130° C. over a period of 1 night.

Yield and physical properties of the copolymer obtained as above are set forth in Table 2.

Reference Example 1

The procedure of Example 16 was repeated except for using bis(1,3-dimethylcyclopentadienyl)-zirconium (IV)-dichloride instead of bis(1,3-dimethylcyclopentadienyl)-zirconium (IV)-bis(trifluoromethanesulfonate) monochloride (Compound No. 203), to perform copolymerization of ethylene and propylene.

Yield and physical properties of the copolymer obtained as above are set forth in Table 2.

Example 17

The procedure of Example 16 was repeated except for using bis(cyclopentadienyl)-zirconium (IV)-bis(p-toluenesulfonate) (Compound No. 101) instead of bis(1,3-dimethylcyclopentadienyl)-zirconium (IV)-bis(trifluoromethanesulfonate) monochloride (Compound No. 203), to perform copolymerization of ethylene and propylene.

Yield and physical properties of the copolymer obtained as above are set forth in Table 2.

Reference Example 2

The procedure of Example 16 was repeated except for using zirconocene dichloride instead of bis(1,3-dimethylcyclopentadienyl)-zirconium (IV)-bis(trifluoromethanesulfonate) monochloride (Compound No. 203), to perform copolymerization of ethylene and propylene.

Yield and physical properties of the copolymer obtained as above are set forth in Table 2.

Example 18

The procedure of Example 16 was repeated except for using ethylenebis(indenyl)-zirconium (IV)-bis(trifluoromethanesulfonate) (Compound No. 300) instead of bis(1,3-dimethylcyclopentadienyl)-zirconium (IV)-bis(trifluoromethanesulfonate) monochloride (Compound No. 203), to perform copolymerization of ethylene and propylene.

Yield and physical properties of the copolymer obtained as above are set forth in Table 2.

Reference Example 3

The procedure of Example 16 was repeated except for using ethylenebis(indenyl)-zirconium (IV)-dichloride instead of bis(1,3-dimethylcyclopentadienyl)-zirconium (IV)-bis(trifluoromethanesulfonate) monochloride (Compound No. 203), to perform copolymerization of ethylene and propylene.

Yield and physical properties of the copolymer obtained as above are set forth in Table 2.

Example 19

Into a stainless steel autoclave of 2 liter thoroughly purged with nitrogen were charged 250 ml of hexane and 750 ml of 4-methyl-1-pentene, and the temperature in the autoclave was raised to 35° C. Then, into the autoclave were charged 0.25 mmol of triisobutyl aluminum, 0.5 mg atom (in terms of aluminum atom) of methylaluminoxane (obtained by firmly drying methylaluminoxane of Sheling Co., Ltd. and dissolving it in toluene) and $1 \times 10^{-3}$ mmol of bis(methylcyclopentadienyl)-zirconium (IV)-bis(trifluoromethanesulfonate) (Compound No. 200). Further, ethylene was introduced into the autoclave to initiate polymerization. Ethylene was continuously supplied into the autoclave in such a manner that the total pressure was kept at 8 kg/cm² gauge, to perform polymerization at 45° C. for 1 hour.

After the polymerization was complete, a small amount of isobutanol was added to the reaction liquid, and the polymerization was terminated. The resulting polymer solution was added to a large excess of methanol to precipitate a polymer, and the the polymer was dried at 130° C. under a reduced pressure for 12 hours.

Yield and physical properties of the copolymer obtained as above are set forth in Table 3.

Example 20

The procedure of Example 19 was repeated except for not using the triisobutyl aluminum, to perform copolymerization of ethylene and 4-methyl-1-pentene.

Yield and physical properties of the copolymer obtained as above are set forth in Table 3.

Reference Example 4

The procedure of Example 20 was repeated except for using zirconocene dichloride instead of bis(methylcyclopentadienyl)-zirconium (IV)-bis(trifluoromethanesulfonate) (Compound No. 200), to perform copolymerization of ethylene and 4-methyl-1-pentene. Yield and physical properties of the copolymer obtained as above are set forth in Table 3.

TABLE 2

| | Transition Metal Compound (Compound No.) | Triisobutyl Aluminum | Yield of Polymer (g) | Activity (*1) | Reduced Specific Viscosity (RSV) (dl/g) | Ethylene Content (%) |
|---|---|---|---|---|---|---|
| Ex. 15 | 202 | present | see text | 56,000 | — | 81.0 |
| Ex. 16 | 203 | absent | 12.16 | 48,600 | 2.09 | 74.1 |
| Ref. Ex. 1 | (*2) | absent | 10.24 | 41,000 | 2.64 | 79.6 |
| Ex. 17 | 101 | absent | 14.92 | 59,640 | 0.72 | 82.3 |
| Ref. Ex. 2 | (*3) | absent | 14.21 | 56,800 | 0.78 | 78.8 |
| Ex. 18 | 300 | absent | 27.61 | 110,400 | 0.79 | 40.4 |
| Ref. Ex. 3 | (*4) | absent | 20.80 | 83,200 | 0.79 | 49.4 |

(*1) g polymer/mg atom metal.hr
(*2) bis(1,3-dimethylcyclopentadienyl)-zirconium (IV)-dichloride
(*3) zirconocene dichloride
(*4) ethylenebis(indenyl)-zirconium (IV)-dichloride

TABLE 3

| | Transition Metal Compound (Compound No.) | Triisobutyl Aluminum | Yield of Polymer (g) | Activity (*1) | MFR (g/10 min) | Density (g/cm³) |
|---|---|---|---|---|---|---|
| Ex. 19 | 200 | present | 34.0 | 34,000 | 0.56 | 0.901 |
| Ex. 20 | 200 | absent | 3.0 | 3,000 | 0.81 | 0.900 |
| Ref. Ex. 4 | (*2) | absent | 2.9 | 2,900 | 0.82 | 0.910 |

(*1) g polymer/mg atom metal.hr
(*2) zirconocene dichloride

Copolymerization of Ethylene Propylene/Ethylidene Norbornene

Example 21

Into a 500 ml glass reactor thoroughly purged with nitrogen was charged 250 ml of purified toluene, and a mixed gas of ethylene and propylene (ethylene/propylene=140 (1/hr)/60 (1/hr)) was introduced into the reactor. Further, 0.3 ml of 5-ethylidene-2-norbornene was charged into the reactor, and the reaction system was kept at 10° C. for 10 minutes with stirring the mixture in the reactor at 2,000 r.p.m. Then, into the reactor was charged 1.0 mg atom (in terms of aluminum atom) of methylaluminoxane (obtained by firmly drying methylaluminoxane of Sheling Co., Ltd. and dissolving it in toluene), and was further charged 0.005 mg atom (in terms of zirconium atom) of ethylenebis(indenyl)zirconium (IV)-bis(trifluoromethanesulfonate) (Compound No. 300). The polymerization was conducted at 10° C. under a normal pressure for 30 min, then a small amount of isobutanol was added to the reaction system, and the polymerization was terminated.

After the reaction was complete, the obtained reaction liquid was introduced into an aqueous solution of dilute hydrochloric acid to remove catalyst residue. After the concentration of the toluene layer, the concentrate was dried at 130° C. under a reduced pressure over a period of 1 night.

The yield of the obtained copolymer was 26 g (polymerization activity: 10,400 g polymer/mmol-Zr.hr).

The ethylene content in the copolymer was 65.5% RSV thereof was 1.01 dl/g, and the iodine value thereof was 3.5.

Reference Example 5

The procedure of Example 21 was repeated except for using ethylenebis(indenyl)-zirconium (IV)-dichloride instead of ethylenebis(indenyl)-zirconium (IV)-bis(trifluoromethanesulfonate) (Compound No. 300), to copolymerize ethylene, propylene and norbornene.

The yield of the obtained copolymer was 23.7 g (polymerization activity: 9,840 g polymer/mmol-Zr.hr).

The ethylene content in the copolymer was 64 9% RSV thereof was 1.09 dl/g, and the iodine value thereof was 3.6.

Polymerization of Ethylene

Example 22

Into a 1 liter glass flask thoroughly purged with nitrogen was charged 400 ml of purified toluene, and the reaction system was kept at 75° C. for 10 min with introducing ethylene in an amount of 100 l/hr.

Then, into the flask was charged 0.8 mg atom (in terms of aluminum atom)-of methylaluminoxane (obtained by firmly drying methylaluminoxane of Sheling Co., Ltd. and dissolving it in toluene), and was further charged 0.0004 mg atom (in terms of zirconium atom) of bis(cyclopentadienyl)-zirconium (IV)-bis(trifluoromethanesulfonate) (Compound No. 102). The polymerization was conducted at 75° C. for 5 min, then a small amount of isobutanol was added to the reaction system, and the polymerization was terminated.

To the obtained polymer suspension was added a small amount of dilute hydrochloric acid, and the resulting suspension was filtered to remove the n-decane solvent. The resultant was washed with hexane and dried at 80° C. over a period of 1 day and night.

The yield of the obtained polyethylene was 6.37 g, and the polymerization activity thereof was 191,100 g polymer/mmol-Zr.hr.

Reference Example 6

The procedure of Example 22 was repeated except for using zirconocene dichloride instead of bis(cyclopentadienyl)-zirconium (IV)-bis(trifluoromethanesulfonate) (Compound No. 102), to polymerize ethylene.

The yield of the obtained polyethylene was 6.30 g, and the polymerization activity thereof was 189,000 g/mmol-Zr.hr.

Reference Example 7

The procedure of Example 22 was repeated except for using [Cp$_2$Zr(CF$_3$SO$_3$)(bipy)]+CF$_3$SO$_3^-$ synthesized by a process described in "Journal of Organometallic Chemistry", 363 (1989), C$_{12}$–C$_{14}$ instead of bis(cyclopentadienyl)-zirconium (IV)-bis(trifluoromethanesulfonate) (Compound No. 102), to polymerize ethylene.

The yield of the obtained polyethylene was 0.19 g, and the polymerization activity thereof was 12,000 g/mmol-Zr.hr.

As is apparent from the above results, the ethylene polymerization activity of the compound having coordinated 2,2'-dipyridine is lower than the compound (Compound No. 102) having no coordinated 2,2'-dipyridine.

Example 23

A process for preparing a support type catalyst maintaining excellent suspension condition for a long period of time and a polymerization process were adopted in order to examine polymerization activities lasting for a long period of time.

Water was adsorbed on 5.5 wt. % of extremely fine silica (obtained by firing F-948 of Fuji Divison Co., Ltd. at 700° C. for 7 hours), and thus treated silica was caused to contact with ½ mol of aluminoxane (obtained by firmly drying methylaluminoxane of Sheling Co., Ltd. and dissolving it in toluene) in toluene at 80° C. for 3 hours to support aluminoxane on the silica. The resulting product was used as an aluminoxane component.

Into a 1 liter glass flask thoroughly purged with nitrogen was charged 1 liter of purified n-decane, and the reaction system was kept at 75° C. for 10 minutes with introducing hydrogen in an amount of 0.3°–2 1/hr and ethylene in an amount of 250 l/hr.

Then, into the flask were charged 0.5 mg atom (in terms of aluminum atom) of triisobutyl aluminum, 5.0 mg atom (in terms of aluminum atom) of the above-obtained aluminoxane component, and 0.02 mg atom (in terms of zirconium atom) of bis(cyclopentadienyl)-zirconium (IV)-bis(methanesulfonate) (Compound No. 100). The polymerization was conducted at 75° C. for 2 hours, then a small amount of isobutanol was added to the reaction system, and the polymerization was terminated.

To the obtained polymer suspension was added a small amount of dilute hydrochloric acid, and the resulting suspension was filtered to remove the n-decane solvent. The resultant was washed with hexane and dried at 80° C. over a period of 1 day and night.

The yield of the obtained polyethylene was 8.8 g, the polymerization activity thereof was 220 g polymer/mmol-Zr.hr, and MFR thereof was 0.45 g/10 min.

Examples 24–27

The procedure of Example 23 was repeated except for using transition metal compounds set forth in Table 4 instead of bis(cyclopentadienyl)-zirconium (IV)-bis(methanesulfonate) (Compound No. 100), to polymerize ethylene.

Yields and physical properties of the obtained polymers are set forth in Table 4.

Reference Examples 8–11

The procedure of Example 23 was repeated except for using zirconium compounds set forth in Table 4 instead of bis(cyclopentadienyl) (IV)-bis(methanesulfonate) (Compound No. 100), to polymerize ethylene.

Yields and physical properties of the obtained polymers are set forth in Table 4.

TABLE 4

| | Transition Metal Compound (Compound No.) | Yield of Polymer (g) | Activity (*1) | MFR (g/10 min) |
|---|---|---|---|---|
| Ex. 24 | 200 | 15.4 | 385 | 0.80 |
| Ex. 25 | 201 | 18.0 | 448 | 1.00 |
| Ex. 26 | 203 | 56.7 | 1,414 | 1.71 |
| Ex. 27 | 300 | 58.6 | 1,465 | <0.1 |
| Ref. Ex. 8 | (*2) | 14.7 | 370 | 3.05 |
| Ref. Ex. 9 | (*3) | 12.5 | 310 | 0.59 |
| Ref. Ex. 10 | (*4) | 45.7 | 1,140 | 1.38 |
| Ref. Ex. 11 | (*5) | 49.0 | 1,230 | 1.16 |

(*1) g polymer/mg atom metal.hr
(*2) zirconocene dichloride
(*3) bis(methylcyclopentadienyl)-zirconium (IV)-dichloride
(*4) bis(1,3-dimethylcyclopentadienyl)-zirconium (IV)-dichloride
(*5) ethylenebis(indenyl)-zirconium (IV)-dichloride

Polymerization of Propylene

Example 28

Into a 1 liter glass flask thoroughly purged with nitrogen was charged 500 ml of purified toluene. Propylene (100 l/hr) was further introduced into the flask, and the reaction system was kept at 30° C. for 10 ml with stirring at 800 r.p.m. Then, into the flask was charged 2.5 mg atom (in terms of aluminum atom) of methylaluminoxane (obtained by firmly drying methylaluminoxane of Sheling Co., Ltd. and dissolving it in toluene), and was further charged 0.02 mg atom (in terms of zirconium atom) of bis(methylcyclopentadienyl)-zirconium (IV)-bis (trifluoromethanesulfonate) (Compound No. 200). The polymerization was conducted at 30° C. under a normal pressure for 2 hours, then a small amount of isobutanol was added to the reaction system, and the polymerization was terminated.

After the reaction was complete, the obtained reaction liquid was introduced into an aqueous solution of dilute hydrochloric acid to remove catalyst residue. After the concentration of the toluene layer, the concentrate was dried at 130° C. under a reduced pressure over a period of 1 night.

Yield and physical properties of the obtained polymer are set forth in Table 5.

Examples 29–31

The procedure of Example 28 was repeated except for using transition metal compounds set forth in Table 5 instead of bis(cyclopentadienyl)-zirconium (IV)-bis(trifluoromethanesulfonate) (Compound No. 200), to polymerize propylene.

Yields and physical properties of the obtained polymers are set forth in Table 5.

Example 32

The procedure of Example 28 was repeated except for using 0.005 mg atom (in terms of zirconium atom) of ethylenebis(indenyl)-zirconium(IV)-bis(trifluoromethanesulfonate) (Compound No. 300) instead of bis(methylcyclopentadienyl)-zirconium (IV)-bis(trifluoromethanesulfonate) (Compound No. 200), using 0.5 mg atom (in terms of aluminum atom) of aluminoxane, additionally using 0.5 mg atom (in terms of aluminum atom) of triisobutyl aluminum, and varying the polymerization temperature to 70° C., to polymerize propylene.

Yield and physical properties of the obtained polymer are set forth in Table 5.

Example 33

The procedure of Example 32 was repeated except for not using triisobutyl aluminum, to polymerize propylene.

Yield and physical properties of the obtained polymer are set forth in Table 5.

Reference Examples 12–13

The procedure of Example 28 was repeated except for using zirconium compounds set forth in Table 5 instead of bis(methylcyclopentadienyl)-zirconium (IV)-bis(trifluoromethanesulfonate) (Compound No. 200), to polymerize propylene.

Yields and physical properties of the obtained polymers are set forth in Table 5.

Reference Example 14

The procedure of Example 28 was repeated except for using ethylenebis(indenyl)-zirconium (IV)-dichloride instead of bis(methylcyclopentadienyl)-zirconium (IV)-bis(trifluoromethanesulfonate) (Compound No. 200) and varying the polymerization temperature to 70° C. to polymerize propylene.

Yield and physical properties of the obtained polymer are set forth in Table 5.

TABLE 5

| | Transition Metal Compound (Compound No.) | Tri-isobutyl Aluminum | Yield of Polymer (g) | Activity (*1) | Intrinsic Viscosity [η] (dl/g) | Tacticity (mm triad fractions) |
|---|---|---|---|---|---|---|
| Ex. 28 | 200 | absent | 29.1 | 1,455 | 0.05 | — |
| Ex. 29 | 201 | absent | 29.9 | 1,485 | 0.06 | — |
| Ex. 30 | 300 | absent | 191.6 | 9,580 | 0.43 | 92.5 |
| Ex. 31 | 400 | absent | 11.4 | 570 | 2.05 | 92.0 |
| Ex. 32 | 300 | present | 12.7 | 2,540 | 0.19 | — |
| Ex. 33 | 300 | absent | 5.1 | 1,020 | 0.10 | 92.5 |
| Ref. Ex 12 | (*2) | absent | 21.1 | 1,055 | 0.05 | — |
| Ref. Ex 13 | (*3) | absent | 137.2 | 6,860 | 0.47 | 92.2 |

TABLE 5-continued

| | Transition Metal Compound (Compound No.) | Tri- isobutyl Aluminum | Yield of Polymer (g) | Activity (*1) | Intrinsic Viscosity [η] (dl/g) | Tacticity (mm triad fractions) |
|---|---|---|---|---|---|---|
| Ref. Ex 14 | (*3) | absent | 3.6 | 729 | 0.10 | 92.0 |

(*1) g polymer/mg atom metal.hr
(*2) bis(methylcyclopentadienyl)-zirconium (IV)-dichloride
(*3) ethylenebis(indenyl)-zirconium (IV)-dichloride

Examples 34–36

The procedure of Example 28 was repeated except for using bis(cyclopentadienyl)-zirconium (IV)-bis(trifluoromethanesulfonate) (Compound No. 102) instead of bis(methylcyclopentadienyl)-zirconium (IV)-bis(trifluoromethanesulfonate) (Compound No. 200), and using methylaluminoxane (MAO) in concentrations set forth in Table 6, to polymerize propylene.

Yields and physical properties of the obtained polymers are set forth in Table 6.

Reference Example 15

The procedure of Example 29 was repeated except for using [$Cp_2Zr(CF_3SO_3)$ (bipy)]$^+CF_3SO_3^-$ synthesized by a process described in "Journal of Organometallic Chemistry" 363 (1989), $C_{12}$–$C_{14}$ instead of bis(methylcyclopentadienyl)zirconium (IV)-bis(trifluoromethanesulfonate) (Compound No. 200), to polymerize propylene.

The yield of the obtained polypropylene was not more than 0.01 g, and the polymerization activity thereof was hardly observed.

As is apparent from the above results, the propylene polymerization activity of the compound having coordinated 2,2'-dipyridine is lower than the compound (Compound No. 102) having no coordinated 2,2'-dipyridine.

Reference Examples 16–18

The procedure of any of Example 34 to 36 was repeated except for using $Cp_2Zr(CF_3SO_3)_2$(THF) synthesized by a process described in "Journal of Organometallic Chemistry", 363 (1989), $C_{12}$–$C_{14}$ instead of bis(cyclopentadienyl)-zirconium (IV)-bis(trifluoromethanesulfonate) (Compound No. 102), to polymerize propylene.

Yields and physical properties of the obtained polymers are set forth in Table 6.

As is apparent from the results set forth in Table 6, the propylene polymerization activity of the compounds having coordinated THF is lower than the compound (Compound No. 102) having no coordinated THF.

TABLE 6

| Example | MAO Concentration (mmol/l) | Yield of Poymer (g) | Polymerization Activity ($\frac{gPP}{mg\ atom\ Zr.hr}$) |
|---|---|---|---|
| Ex. 34 | 1 | 6.0 | 300 |
| Ex. 35 | 3 | 22.1 | 1,105 |
| Ex. 36 | 5 | 24.5 | 1,225 |
| Ref. Ex. 16 | 1 | 1.6 | 80 |
| Ref. Ex. 17 | 3 | 15.9 | 795 |
| Ref. Ex. 18 | 5 | 19.8 | 990 |

Carrier-Support Type Catalyst

Polymerization of ethylene

Example 37

Preparation of Water-Adsorbed Silica

Into a quartz tube having an inner diameter of 45 mm equipped in an electric furnace was charged 150 g of silica (F-948, available from Fuji Divison Co., Ltd.), and the silica was dried at 200° C. for 4 hours in a stream of nitrogen and further dried at 700° C. for 7 hours.

Then, into a 500 ml egg-plant type flask was charged 30 g of the above-obtained dry silica, and to the silica was added 1.8 ml of water in an atmosphere of nitrogen. The flask was rotated for 1 hour to stir the contents, to obtain water-adsorbed silica.

When 20 g of the water-adsorbed silica was dried at 200° C. for 4 hours in an atmosphere of nitrogen, 1.14 g of loss in weight was confirmed. Accordingly, water content in the water-adsorbed silica was 5.70 wt. %.

Supporting of Aluminoxane

Into a 400 ml glass flask purged with nitrogen were charged 85 ml of toluene and 65.2 ml of an organoaluminum oxy-compound (obtained by firmly drying methylaluminoxane of Sheling Co., Ltd. and dissolving it in toluene; Al concentration: 1.15 mol/l), and the temperature of the reaction system was set to 0° C. with stirring. To the reaction liquid was added 9.0 g of the above-obtained water-adsorbed silica over a period of 30 min. Thereafter, the reaction was conducted at 20°–25° C. for 1 hour and then further conducted at 80° C. for 3 hours. Thus, aluminoxane-supported silica was obtained.

Supporting of Zirconium Compound

Into a 50 ml glass flask purged with nitrogen were charged 10 mmol (in terms of aluminum atom) of the above-obtained aluminoxane-supported silica and 0.04 mmol (in terms of zirconium atom) of bis(methylcyclopentadienyl)-zirconium (IV)-bis(trifluoromethanesulfonate) (Compound No. 200) obtained in Example 2, and they were stirred at 30° C. for 2 hours, to obtain a support type catalyst.

Polymerization

Into a 1 liter glass flask thoroughly purged with nitrogen was charged 1 liter of n-decane, and the reaction system was kept at 75° C. for 10 min. with introducing hydrogen in an amount of 1 l/hr and ethylene in an amount of 250 l/hr.

Then, into the flask were charged 0.5 mg atom (in terms of aluminum atom) of triisobutyl aluminum and 0.02 mg atom (in terms of zirconium atom) of the above-obtained support type catalyst. The polymerization was conducted at 75° C. for 2 hours, then a small amount of isobutanol was added to the reaction system, and the polymerization was terminated.

Yield and physical properties of the obtained polymer are set forth in Table 7.

Example 38

The procedure of Example 37 was repeated except for using bis(methylcyclopentadienyl)-zirconium (IV)-trifluoromethanesulfonate monochloride (Compound No. 201) instead of bis(methylcyclopentadienyl)-zirconium (IV)-bis(trifluoromethanesulfonate) (Compound No. 200), to polymerize ethylene.

Yield and physical properties of the obtained polymer are set forth in Table 7.

Reference Example 19

The procedure of Example 37 was repeated except for using bis(cyclopentadienyl)-zirconium (IV)-dichloride instead of bis(methylcyclopentadienyl)-zirconium (IV)-bis(trifluoromethanesulfonate) (Compound No. 200) and not using triisobutyl aluminum, to polymerize ethylene.

Yield and physical properties of the obtained polymer are set forth in Table 7.

Example 41

The procedure of Example 37 was repeated except for using ethylenebis(indenyl)-zirconium (IV)-bis(trifluoromethanesulfonate) (Compound No. 300) instead of bis(methylcyclopentadienyl)-zirconium (IV)-bis(trifluoromethanesulfonate) (Compound No. 200), to polymerize ethylene.

Yield and physical properties of the obtained polymer are set forth in Table 7.

Reference Example 21

The procedure of Example 37 was repeated except for using ethylenebis(indenyl)-zirconium (IV)-dichloride instead of bis(methylcyclopentadienyl)-zirconium (IV)-bis(trifluoromethanesutfonate) (Compound No. 200) and not using triisobutyl aluminum, to polymerize ethylene.

Yield and physical properties of the obtained polymer are set forth in Table 7.

TABLE 7

|  | Transition Metal Compound (Compound No.) | Triisobutyl Aluminum | Yield of Polymer (g) | Activity (*1) | MFR (g/10 min) |
|---|---|---|---|---|---|
| Ex. 37 | 200 | present | 16.9 | 424 | 0.80 |
| Ex. 38 | 201 | present | 19.8 | 493 | 1.00 |
| Ref. Ex 19 | (*2) | absent | 4.6 | 115 | 0.59 |
| Ex. 39 | 203 | present | 62.4 | 1,555 | 1.71 |
| Ex. 40 | 203 | absent | 52.9 | 1,329 | 1.20 |
| Ref. Ex 20 | (*3) | absent | 16.9 | 422 | 1.38 |
| Ex. 41 | 300 | present | 64.5 | 1,612 | <0.1 |
| Ref. Ex 21 | (*4) | absent | 18.2 | 455 | 1.16 |

(*1) g polymer/mg atom metal.hr
(*2) bis(methylcyclopentadienyl)-zirconium (IV)-dichloride
(*3) bis(1,3-dimethylcyclopentadienyl)-zirconium (IV)-dichloride
(*3) ethylenebis(indenyl)-zirconium (IV)-dichloride Yield and physical properties of the obtained polymer are set forth in Table 7.

Example 39

The procedure of Example 37 was repeated except for using bis(1,3-dimethylcyclopentadienyl)-zirconium (IV)-trifluoromethanesulfonate monochloride (Compound No. 203) instead of bis(methylcyclopentadienyl)-zirconium (IV)-bis(trifluoromethanesulfonate) (Compound No. 200), to polymerize ethylene.

Yield and physical properties of the obtained polymer are set forth in Table 7.

Example 40

The procedure of Example 37 was repeated except for using bis(1,3-dimethylcyclopentadienyl)-zirconium (IV)-bis(trifluoromethanesulfonate) (Compound No. 202) instead of bis(methylcyclopentadienyl)-zirconium (IV)-bis(trifluoromethanesulfonate) (Compound No. 200), to polymerize ethylene.

Yield and physical properties of the obtained polymer are set forth in Table 7.

Reference Example 20

The procedure of Example 37 was repeated except for using bis(1,3-dimethylcyclopentadienyl)-zirconium (IV)-dichloride instead of bis(methylcyclopentadienyl)-zirconium (IV)-bis(trifluoromethanesulfonate) (Compound No. 200) and not using triisobutyl aluminum, to polymerize ethylene.

Yield and physical properties of the obtained polymer are set forth in Table 7.

Polymerization of Propylene

Example 42

Into a 400 ml glass flask thoroughly purged with nitrogen were charged 125 ml of toluene and 74.6 ml of a toluene solution of organoaluminum oxy-compound (obtained by firmly drying methylaluminoxane-of Sheling Co., Ltd. and dissolving it in toluene; Al concentration: 1.34 mol/l), and the reaction system was cooled to 0° C. To the solution was added dry silica (obtained by drying F-948 of Fuji Divison Co., Ltd. dried at 130° C. and 5 mmHg for 5 hours by means of an evaporator; content of hydroxyl group: 2.7 wt. %) over a period of 30 min. During this process, the reaction system was kept at 0° C. Thereafter, the reaction was conducted at room temperature for 1 hour and then further conducted at 80° C. for 3 hours. 30 ml of the obtained suspension (Al: 15 mmol) was placed in other glass flask, and to the suspension was added 26.0 ml (0.06 mmol) of a toluene solution of ethylenebis(indenyl)-zirconium (IV)-bis(trifluoromethanesulfonate) (Compound No. 300) (Zr: 0.00231 mol/l), and the resulting suspension was stirred for 5 min. Then, the toluene solution was removed from the suspension by means of decantation and replaced with n-hexane, to obtain a solid catalyst. It was confirmed from the elemental analysis that zirconium was completely supported on silica.

Into a 2 liter stainless steel autoclave thoroughly purged with nitrogen was charged 150 g of sodium chloride (special grade, available from Wako Junyaku Co., Ltd.), and the sodium chloride was dried at 90° C. under a reduced pressure for 1 hour. The pressure in the autoclave was returned to a normal pressure by introduction of propylene gas, and the temperature of the reaction system was set to 50° C. Then, into the autoclave were added 0.01 mg atom (in terms of zirconium atom) of the above-obtained solid catalyst and 0.5 mmol of triisobutyl aluminum, followed by introducing propylene gas to increase a total pressure to 7 kg/cm$^2$-G, so as to initiate polymerization. Further, only propylene gas was replenished into the autoclave to keep the total pressure at 7 kg/cm$^2$-G and the polymerization was conducted at 50° C. for 1 hour.

After the polymerization was complete, the reaction liquid was washed with water to remove sodium chloride, and the remaining polymer was washed with methanol. Thereafter, the obtained polymer was dried at 80° C. under a reduced pressure over a period of 1 night.

As a result, 18.4 g (polymerization activity: 1,840 gPP/mmol-Zr.hr) of a propylene polymer having an intrinsic viscosity ($\eta$) of 0.31 dl/g and a bulk specific gravity of 0.245 g/cm$^3$ was obtained.

Example 43

The procedure of Example 42 was repeated except for not using triisobutyl aluminum, to polymerize propylene.

As a result, 17.8 g (polymerization activity: 1,780 gPP/mmol-Zr.hr) of a propylene polymer having an intrinsic viscosity ($\eta$) of 0.25 dl/g and a bulk specific gravity of 0.226 g/cm$^3$ was obtained.

Reference Example 22

The procedure of Example 42 was repeated except for using ethylenebis(indenyl)-zirconium (IV)-dichloride instead of ethylenebis(indenyl)-zirconium (IV)-bis(-trifluoromethanesulfonate) (Compound No. 300) and not using triisobutyl aluminum, to polymerize propylene.

As a result, 12.8 g (polymerization activity: 1,280 gPP/mmol-Zr.hr) of a propylene polymer having an intrinsic viscosity ($\eta$) of 0.32 dl/g and a bulk specific gravity of 0.185 g/cm$^3$ was obtained.

The results are set forth in Table 8.

C. Thereafter, the reaction was conducted at room temperature for 1 hour and then further conducted at 80° C. for 3 hours.

30 ml of the obtained suspension (Al: 15 mmol) was placed in other glass flask, and to the suspension was added 4.7 ml (0.30 mmol) of a toluene solution of bis(-methylcyclopentadienyl)-zirconium (IV)-bis(trifluoromethanesulfonate) (Compound No. 200) (Zr: 0.0635 mol/l), and the resulting suspension was stirred for 5 min. Then, the toluene solution was removed from the suspension by means of decantation and replaced with n-hexane, to obtain a solid catalyst. It was confirmed from the elemental analysis that zirconium was completely supported on silica.

Into a 2 liter stainless steel autoclave thoroughly purged with nitrogen was charged 150 g of sodium chloride (special grade, available from Wako Junyaku Co., Ltd.), and the sodium chloride was dried at 90° C. under a reduced pressure for 1 hour. The pressure in the autoclave was returned to a normal pressure by introduction of a mixed gas of ethylene and 1-butene (content of 1-butene: 5.9% by mol), and the temperature of the reaction system was set to 75° C. Then, to the autoclave were added 0.01 mg atom (in terms of zirconium atom) of the above-obtained solid catalyst and 0.5 mmol of triisobutyl aluminum, followed by introducing 50 Nml of hydrogen and the above mixed gas of ethylene and 1-butene to increase a total pressure to 8 kg/cm$^2$-G, so as to initiate polymerization. The temperature of the reaction system was immediately raised to 80° C. Further, only the mixed gas was replenished into the autoclave to keep the total pressure at 8 kg/cm$^2$-G, and the polymerization was conducted at 80° C. for 1 hour.

After the polymerization was complete, the reaction liquid was washed with water to remove sodium chloride, and 0 the remaining polymer was washed with methanol. Thereafter, the obtained polymer was dried at 80° C. under a reduced pressure over 1 night.

As a result, 49.6 g (polymerization activity: 4,960 g polymer/mmol-Zr.hr) of an ethylene/butene polymer having MFR 5 (measured under a load of 2.16 kg at 190° C.) of 2.70 g/10 min, a bulk specific gravity of 0.307 g/cm$^3$ and a density of 0.924 g/cm$^3$ was obtained.

TABLE 8

| | Transition Metal Compound (Compound No.) | Tri-isobutyl Aluminum | Yield of Polymer (g) | Activity (*1) | Intrinsic Viscosity [$\eta$] (dl/g) | Bulk Specific Gravity (g/cm$^3$) |
|---|---|---|---|---|---|---|
| Ex. 42 | 300 | present | 18.4 | 1,840 | 0.31 | 0.245 |
| Ex. 43 | 300 | absent | 17.8 | 1,780 | 0.25 | 0.226 |
| Ref. Ex 22 | (*2) | absent | 12.8 | 1,280 | 0.32 | 0.185 |

(*1) g polymer/mg atom metal.hr
(*2) ethylenebis(indenyl)-zirconium (IV)-dichloride Polymerization of Ethylene/Butene Example 44

Into a 400 ml glass flask thoroughly purged with nitrogen were charged 125 ml of toluene and 74.6 ml of a toluene solution of organoaluminum oxy-compound (obtained by firmly drying methylaluminoxane of Shelling Co., Ltd. and dissolving it in toluene; Al concentration: 1.34 mol/l), and the reaction system was cooled to 0° C. To the solution was added dry silica (obtained by drying F-948 of Fuji Divison Co., Ltd. dried at 130° C. and 5 mmHg for 5 hours by means of an evaporator; content of hydroxyl group: 2.7 wt. %) over 30 min. During this process, the reaction system was kept at 0°

Example 45

The procedure of Example 44 was repeated except for not using triisobutyl aluminum and introducing 20 Nml of hydrogen into the autoclave, to perform copolymerization of ethylene and butene.

As a result, 15.9 g (polymerization activity: 1,590 g polymer/mmol-Zr.hr) of an ethylene/butene polymer having MFR (measured under a load of 2.16 kg at 190° C.) of 2.57 g/10 min, a bulk specific gravity of 0.200 g/cm$^3$ and a density of 0.933 g/cm$^3$ was obtained.

Reference Example 23

The procedure of Example 44 was repeated except for using bis(methylcyclopentadienyl)-zirconium (IV)-dichloride instead of bis(methylcyclopentadienyl)-zirconium (IV)-bis(trifluoromethanesulfonate) (Compound No. 200) and not using triisobutyl aluminum,? to perform copolymerization of ethylene and butene.

As a result, 10.5 g (polymerization activity: 1,050 g polymer/mmol-Zr.hr) of an ethylene/butene polymer having MFR (measured under a load of 2.16 kg at 190° C.) of 51.2 g/10 min, a bulk specific gravity of 0.096 g/cm$^3$ and a density of 0.942 g/cm$^3$ was obtained.

The results are set forth in Table 9.

TABLE 9

| | Catalyst Component (NO.) | Triisobutyl Aluminum | Yield of Polymer (g) | Activity (*1) | MFR (g/10 min) | Bulk Specific Gravity (g/cm$^3$) | Density (g/cm$^3$) | n-decane soluble portion (wt %) |
|---|---|---|---|---|---|---|---|---|
| Ex. 44 | 200 | present | 49.6 | 4,960 | 2.70 | 0.307 | 0.924 | 0.6 |
| Ex. 45 | 200 | absent | 15.9 | 1,590 | 2.57 | 0.200 | 0.933 | 0.3 |
| Ref. Ex. 23 | (*2) | absent | 10.5 | 1,050 | 51.2 | 0.096 | 0.942 | 0.3 |

(*1) g polymer/mg atom metal.hr
(*2) bis(methylcyclopentadienyl)-zirconium (IV)-dichloride Polymerization of propylene

Example 46

Into a 400 ml glass flask thoroughly purged with nitrogen were charged 125 ml of toluene and 74.6 ml of a toluene solution of organoaluminum oxy-compound (obtained by firmly drying methylaluminoxane of Sheling Co., Ltd. and dissolving it in toluene; Al concentration: 1.34 mol/l), and the reaction system was cooled to 0° C. To the solution was added dry silica (obtained by drying F-948 of Fuji Divison Co., Ltd. dried at 130° C. and 5 mmHg for 5 hours by means of an evaporator; content of hydroxyl group: 2.7 wt. %) over 30 min. During this process, the reaction system was kept at 0° C. Thereafter, the reaction was conducted at room temperature for 1 hour and then further conducted at 80° C. for 3 hours.

40 ml of the obtained suspension was placed in other 400 ml glass flask, and to the suspension were added 150 ml of hexane, 34.6 ml (0.08 mmol) of a toluene solution of ethylenebis(indenyl)-zirconium (IV)-bis(trifluoromethanesulfonate) (Compound No. 300) (Zr: 0.00231 mol/l) and 1.0 ml of triisobutyl aluminum (Al: 1.0 mol/l), and the resulting suspension was stirred for 5 min. Thereafter, ethylene gas (normal pressure) was continuously introduced into the flask to perform prepolymerization at 30° C. for 1.5 hours. The polymerization reaction liquid was filtered over a G-3 filter, and the resultant was washed with 200 ml of n-hexane. The same washing was repeated three times, to obtain a solid catalyst containing 1.4 mg of zirconium and 1.5 g of polyethylene, based on 1 g of silica. For the subsequent polymerization, a suspension obtained by resuspending this solid catalyst was employed.

Into a 2 liter stainless steel autoclave thoroughly purged with nitrogen was charged 150 g of sodium chloride (special grade, available from Wako Junyaku Co., Ltd.), and the sodium chloride was dried at 90° C. under a reduced pressure for 1 hour. The pressure in the autoclave was returned to a normal pressure by introduction of propylene gas, and the temperature of the reaction system was set to 50° C. Then, into the autoclave were added 0.01 mg atom (in terms of zirconium atom) of the above-obtained solid catalyst and 0.5 mmol of triisobutyl aluminum, followed by introducing propylene gas to increase a total pressure to 7 kg/cm$^2$-G, so as to initiate polymerization. Further, only propylene gas was replenished into the autoclave to keep the total pressure at 7 kg/cm$^2$-G, and the polymerization was conducted at 50° C. for 1 hour.

After the polymerization was complete, the reaction liquid was washed with water to remove sodium chloride, and the remaining polymer was washed with methanol. Thereafter, the obtained polymer was dried at 80° C. under a reduced pressure over 1 night.

As a result, 53.5 g (polymerization activity: 5,350 gPP/mmol-Zr.hr) of a propylene polymer having an intrinsic viscosity ($\eta$) of 0.33 dl/g and a bulk specific gravity of 0,390 g/cm$^3$ was obtained.

Example 47

The procedure of

Example 46 was repeated except for not using triisobutyl aluminum in the polymerization, to polymerize propylene.

As a result, 41.5 g (polymerization activity: 4,150 gPP/mmol-Zr.hr) of a propylene polymer having an intrinsic viscosity ($\eta$) of 0.30 dl/g and a bulk specific gravity of 0.352 g/cm$^3$ was obtained.

Reference Example 24

Into a 400 ml glass flask thoroughly purged with nitrogen were charged 125 ml of toluene and 74.6 ml of a toluene solution of organoaluminum oxy-compound (obtained by firmly drying methylaluminoxane of Sheling Co., Ltd. and dissolving it in toluene; Al concentration: 1.34 mol/l), and the reaction system was cooled to 0° C. To the solution was added dry silica (obtained by drying F-948 of Fuji Divison Co., Ltd. dried at 130° C. and 5 mmHg for 5 hours by means of an evaporator; content of hydroxyl group: 2.7 wt. %) over 30 min. During this process, the reaction system was kept at 0° C. Thereafter, the reaction was conducted at room temperature for 1 hour and then further conducted at 80° C. for 3 hours.

30 ml of the obtained suspension (Al: 15 mmol) was placed in other glass flask, and to the suspension was added 26.0 ml (0.06 mmol) of a toluene solution of ethylenebis(indenyl) zirconium (IV)-dichloride (Zr: 0.00231 mol/l), and the resulting suspension was stirred for 5 min. Then, the toluene solution was removed from the suspension by means of decantation and replaced with n-hexane, to obtain a solid catalyst. It was confirmed from the elemental analysis that zirconium was completely supported on silica.

Into a 2 liter stainless steel autoclave thoroughly purged with nitrogen was charged 150 g of sodium chloride (special grade, available from Wako Junyaku Co., Ltd.), and the sodium chloride was dried at 90° C. under a reduced pressure for 1 hour. The pressure in the autoclave was returned to a normal pressure by introduction of propylene gas, and the temperature of the reaction system was set to 50° C. Then, to the autoclave was added 0.01 mg atom (in terms of zirconium atom) of the above-obtained solid catalyst, followed by introducing propylene gas to increase a total pressure to 7 kg/cm$^2$-G, so as to initiate polymerization. Further, only propylene gas was replenished into the autoclave to keep the total pressure at 7 kg/cm$^2$-G, and the polymerization was conducted at 50° C. for 1 hour.

After the polymerization was complete, the reaction liquid was washed with water to remove sodium chloride, and the remaining polymer was washed with methanol. Thereafter, the obtained polymer was dried at 80° C. under a reduced pressure over 1 night.

As a result, 17.8 (polymerization activity: 1,780 gPP/mmol-Zr.hr) g of a propylene polymer having an intrinsic viscosity ($\eta$) of 0.25 dl/g and a bulk specific gravity of 0.226 g/cm$^3$ was obtained.

The results are set forth in Table 10.

TABLE 10

| | Catalyst Component | Prepoly merization | Triisobutyl Aluminum | Yield of Polymer (g) | Activity (*1) | Intrinsic viscosity [$\eta$] (dl/g) | Bulk Specific Gravity (g/cm$^3$) |
|---|---|---|---|---|---|---|---|
| Ex. 46 | 300 | made | present | 53.5 | 5,350 | 0.33 | 0.390 |
| Ex. 47 | 300 | made | absent | 41.5 | 4,150 | 0.30 | 0.352 |
| Ref. Ex. 24 | (*2) | not made | absent | 17.8 | 1,780 | 0.25 | 0.226 |

(*1) g polymer/mg atom metal.hr
(*2) ethylenebis(indenyl)-zirconium (IV)-dichloride Copolymerization of Ethylene/Butene Example 48

Into a 400 ml glass flask thoroughly purged with nitrogen were charged 125 ml of toluene and 74.6 ml of a toluene solution of organoaluminum oxy-compound (obtained by firmly drying methylaluminoxane of Sheling Co., Ltd. and dissolving it in toluene; Al concentration: 1.34 mol/l), and the reaction system was cooled to 0° C. To the solution was added dry silica (obtained by drying F-948 of Fuji Divison Co., Ltd. dried at 130° C. and 5 mmHg for 5 hours by means of an evaporator; content of hydroxyl group: 2.7 wt. %) over 30 min. During this process, the reaction system was kept at 0° C. Thereafter, the reaction was conducted at room temperature for 1 hour and ! then further conducted at 80° C. for 3 hours.

40 ml of the obtained suspension was placed in other 400 ml glass flask, and to the suspension were added 150 ml of hexane, 6.3 ml of a toluene solution (0.0635 mmol/l) of bis(methylcyclopentadienyl)-zirconium (IV)-bis(trifluoromethanesulfonate) (Compound No. 200) and 1.0 ml of triisobutyl aluminum (Al: 1.0 mol/l), and the resulting suspension was stirred for 5 min. Thereafter, ethylene gas (normal pressure) was continuously introduced into the flask to perform prepolymerization at 30° C. for 2 hours. The polymerization reaction liquid was filtered over a G-3 filter, and the resultant was washed with 200 ml of n-hexane. The same washing was repeated three times, to obtain a solid catalyst containing 5 mg of zirconium and 7.7 g of polyethylene, based on 1 g of silica. For the subsequent polymerization, a suspension obtained by resuspending this solid catalyst was employed.

Into a 2 liter stainless steel autoclave thoroughly purged with nitrogen was charged 150 g of sodium chloride (special grade, available from Wako Junyaku Co., Ltd.), and the sodium chloride was dried at 90° C. under a reduced pressure for 1 hour. The pressure in the autoclave was returned to normal pressure by introduction of a mixed gas of ethylene and 1-butene (content of 1-butene: 5.9% by mol), and the temperature of the reaction system was set to 75° C. Then, into the autoclave were added 0.01 mg atom (in terms of zirconium atom) of the above-obtained solid catalyst and 0.5 mmol of triisobutyl aluminum, followed by introducing the above mixed gas to increase a total pressure to 8 kg/cm$^2$-G, so as to initiate polymerization. The temperature of the reaction system was immediately raised to 80° C. Further, only the mixed gas was replenished into the autoclave to keep the total pressure at 8 kg/cm$^2$-G, and the polymerization was conducted at 80° C. for 1 hour.

After the polymerization was complete, the reaction liquid was washed with water to remove sodium chloride, and the remaining polymer was washed with methanol. Thereafter, the obtained polymer was dried at 80° C. under a reduced pressure over 1 night.

As a result, 49.6 g (polymerization activity: 4,960 g polymer/mmol-Zr.hr) of an ethylene/butene copolymer having MFR (measured under a load of 2.16 kg at 190° C.) of 2.70 g/10 min and a bulk specific gravity of 0.307 g/cm$^3$ was obtained.

Example 49

The procedure of Example 48 was repeated except for not using triisobutyl aluminum in the polymerization, to perform copolymerization of ethylene and butene.

As a result, 29.7 g (polymerization activity: 2,970 g polymer/mmol-Zr.hr) of an ethylene/butene copolymer having MFR (measured under a load of 2.16 kg at 190° C.) of 8.03 g/10 min and a bulk specific gravity of 0.213 g/cm$^3$ was obtained.

Reference Example 25

The procedure of Example 48 was repeated except for using bis(methylcyclopentadienyl)-zirconium (IV)-dichloride instead of bis(methylcyclopentadienyl)zirconium (IV)-bis(trifluoromethanesulfonate) (Compound No. 200), not performing the prepolymerization and not using triisobutyl aluminum, to perform copolymerization of ethylene and butene.

As a result, 10.5 g (polymerization activity: 1,050 g polymer/mmol-Zr.hr) of an ethylene/butene copolymer having MFR (measured under a load of 2.16 kg at 190° C.) of 51.2 g/10 min and a bulk specific gravity of 0.096 g/cm$^3$ was obtained.

The results are set forth in Table 11

TABLE 11

| | Catalyst Component | Prepolymerization | Triisobutyl Aluminum | Yield of Polymer (g) | Activity (*1) | MFR (g/10 min) | Bulk Specific Gravity (g/cm³) |
|---|---|---|---|---|---|---|---|
| Ex. 48 | 200 | made | present | 49.6 | 4,960 | 2.70 | 0.307 |
| Ex. 49 | 200 | made | absent | 29.7 | 2,970 | 8.03 | 0.213 |
| Ref. Ex. 25 | (*2) | not made | absent | 10.5 | 1,050 | 51.2 | 0.096 |

(*1) g polymer/mg atom metal.hr
(*2) bis(methylcyclopentadienyl)-zirconium (IV)-dichloride

What is claimed is:

1. A novel transition metal compound having the following formula:

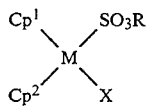

wherein M is a transition metal in Group IVB of the periodic table, each of Cp¹ and Cp² is a group having a cyclopentadienyl skeleton, said group having a cyclopentadienyl skeleton optionally having an alkyl group, Cp¹ and Cp² optionally are linked to each other through an alkylene group, isopropylidene group, diphenylmethylene group, a silylene group or dimethylsilylene group, R is an alkyl group, an alkyl group substituted with a halogen atom, an aryl group, an aryl group substituted with a halogen atom or an aryl group substituted with an alkyl group and X is $SO_3R$, a halogen atom, R, OR, $NR_n$, $S(O)_qR$, $SiR_3$ or $P(O)_qR_3$, where R is defined above, n is 1, 2 or 3, and q is 0, 1 or 2.

2. The transition metal compound according to claim 1 wherein X is $SO_3R$, OR, $NR_n$ or a halogen atom.

3. The transition metal compound according to claim 1 wherein M is zirconium, titanium or hafnium.

4. The transition metal compound according to claim 1 wherein the group having the cyclopentadienyl skeleton is an alkyl-substituted cyclopentadienyl group or an indenyl group.

5. The transition metal compound according to claim 1 wherein the halogen atom is a fluorine, chlorine, bromine or iodine atom.

6. The transition metal compound according to claim 1 wherein X is $SO_3R$ or halogen.

* * * * *